US 9,693,426 B2

(12) United States Patent
Van Der Werff

(10) Patent No.: US 9,693,426 B2
(45) Date of Patent: Jun. 27, 2017

(54) INTEGRATED OCCUPANCY AND AMBIENT LIGHT SENSORS

(71) Applicant: Empire Technology Development LLC, Wilmington, DE (US)

(72) Inventor: Matthew Van Der Werff, Palmerston North (NZ)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/975,690

(22) Filed: Dec. 18, 2015

(65) Prior Publication Data
US 2016/0105942 A1 Apr. 14, 2016

Related U.S. Application Data

(63) Continuation of application No. 13/509,351, filed as application No. PCT/US2012/027660 on Mar. 5, 2012, now Pat. No. 9,253,857.

(51) Int. Cl.
*H05B 37/02* (2006.01)
*H05B 33/08* (2006.01)
(Continued)

(52) U.S. Cl.
CPC ..... *H05B 37/0218* (2013.01); *H05B 33/0869* (2013.01); *H05B 33/0872* (2013.01);
(Continued)

(58) Field of Classification Search
CPC ............ H05B 37/0218; H05B 37/0227; H05B 37/0245; H05B 37/0272; H05B 33/0869; H05B 33/0872; F21V 23/0464; F21K 9/13
(Continued)

(56) References Cited

U.S. PATENT DOCUMENTS 7,923,936 B2 4/2011 Cooley et al.
8,749,145 B2 * 6/2014 Jones ................. H05B 37/0218
315/149
(Continued)

FOREIGN PATENT DOCUMENTS

CN 102165698 A 8/2011
CN 202005036 U 10/2011
(Continued)

OTHER PUBLICATIONS

International Search Report & Written Opinion dated Apr. 13, 2012 in PCT Application No. PCT/US12/27660.
(Continued)

*Primary Examiner* — Ryan Jager
(74) *Attorney, Agent, or Firm* — Turk IP Law, LLC

(57) ABSTRACT

Technologies are generally described herein for controlling and using integrated occupancy and ambient light sensors. In some examples, a lighting device includes an illumination source, a light sensor, and a transceiver. A determination can be made to determine if the illumination source is operating in an on mode of operation or an off mode of operation. In response to determining that the illumination source is operating in the off mode of operation, an instruction can be received at the lighting device to pulse operation of the illumination source to emit a light pulse. The lighting device can also be configured to receive an instruction to compressively sense, using the light sensor, a light level associated with an area illuminated by the light pulse. The lighting device can output data indicating the light level compressively sensed by the light sensor.

17 Claims, 8 Drawing Sheets

(51) Int. Cl.
  *F21V 23/04* (2006.01)
  *F21Y 105/10* (2016.01)
  *F21K 9/23* (2016.01)
  *F21Y 115/10* (2016.01)

(52) U.S. Cl.
  CPC ..... *H05B 37/0227* (2013.01); *H05B 37/0245* (2013.01); *H05B 37/0272* (2013.01); *F21K 9/23* (2016.08); *F21V 23/0464* (2013.01); *F21Y 2105/10* (2016.08); *F21Y 2115/10* (2016.08)

(58) Field of Classification Search
  USPC ....................................................... 315/151
  See application file for complete search history.

(56) References Cited

U.S. PATENT DOCUMENTS

| | | | | |
|---|---|---|---|---|
| 8,860,324 B2* | 10/2014 | Barrilleaux | ........ | H05B 37/0272 315/151 |
| 2006/0087245 A1 | 4/2006 | Ng et al. | | |
| 2010/0295946 A1 | 11/2010 | Reed et al. | | |
| 2011/0031897 A1* | 2/2011 | Henig | ................ | H05B 37/0254 315/297 |
| 2011/0282468 A1 | 11/2011 | Ashdown | | |
| 2012/0025717 A1 | 2/2012 | Klusmann et al. | | |
| 2013/0038217 A1 | 2/2013 | Askin et al. | | |
| 2013/0194259 A1* | 8/2013 | Bennett | ................ | G06T 19/006 345/420 |
| 2013/0334971 A1* | 12/2013 | Jones | ................ | H05B 37/0272 315/151 |
| 2014/0225513 A1* | 8/2014 | Park | ................ | H05B 33/0848 315/151 |

FOREIGN PATENT DOCUMENTS

| | | | |
|---|---|---|---|
| EP | 2262350 A1 | 12/2010 | |
| JP | 2000306684 A | 2/2000 | |
| JP | 2002050488 A | 2/2002 | |
| JP | 2002289373 A | 10/2002 | |
| JP | 2008097864 A | 4/2008 | |
| JP | 2010072508 A | 4/2010 | |
| JP | 2011108417 A | 6/2011 | |
| JP | 2011204637 A | 10/2011 | |
| JP | 2012028015 A | 2/2012 | |
| JP | 2012505600 A | 3/2012 | |
| WO | 2011063311 A | 5/2011 | |
| WO | 2011087908 A1 | 7/2011 | |

OTHER PUBLICATIONS

Baraniuk, R. G. "Compressive Sensing," [Online]. Available: http://dsp.rice.edu/sites/dsp.rice.edu/files/cs/baraniukCSlecture07. pdf. [Accessed 07107 /2011 ].

Stinnett, R. et al., "Compressive Imaging," Team Single Pixel Camera, 2007. [Online]. Available: http://elec424.rice.edu/spc/. [Accessed Jul. 7, 2011].

Takhar, D., "DMD Implementation of a Single Pixel Camera Based on Compressed Sensing," Rice University, 2007. [Online]. Available: http://focus.ti.com/lit/ml/sprp592/sprp592.pdf. [Accessed Jul. 7, 2011].

Isaac, M., "Google's Platform Extends Its Reach With Android@Home," Wired, Nov. 5, 2011. [Online]. Available: http://www.wired.com/gadgetlab/2011 /05/android-at-home-google-io/. [Accessed 07107 /2011 ].

"Insteon Compatible Automation Controller," Smarthome, [Online]. Available: http://www.smarthome.com/12231 DB/ISY-99i-I NSTEON-Compatible-Automation-Controller-with-Dual-Band-PLM/p. aspx. [Accessed Jul. 7, 2011].

The Future Is Bright LED Lights, SolarAndalucia, [Online]. Available: http://solarandalucia.net/featured/the-futu re-is-brig htled-lig hts/. [Accessed 0710712011 ].

"Leviton Multi-Tech PIR/Ultrasonic Occuapncy Sensor Decora Wall Switch," SafetyED, [Online]. Available: http://www.safetyed. org/levitonmulti-techpirultrasonicoc-cupancysensordecorawallswitchwhite.aspx.[Accessed Aug. 7, 2011].

"Insteon Remote Control Dimmer Outlet," Insteon, [Online]. Available: http://www.insteon.neU2472DWH-outletlinc-dualband.html. [Accessed Aug. 7, 2011 ].

"Fulcrum 20031-107 Motion Sensor LED Porch Light," Amazon, [Online]. Available: http://www.amazon.com/dp/B004H8EY3U/ ref=asc_df_B004H8EY3U1495710?sm id =AT VP D KI KXO DE R&tag=nextag us0039315-20&1 in kCode=as n&creative=395093 &creativeAS IN=B004 H 8 EY3 U.[Accessed Jul. 7, 2011].

"CCTV Motion Detection 360 Dome Camera," Home 360 Security, [Online]. Available: http://www.homesecurity361.com/cctv-motion-detection-360-dome-camera-w-3-cameras-built-in.html. [Accessed Aug. 7, 2011].

Branscombe, M., "Android@Home: What you Need to Know," TechRadar.com, Dec. 5, 2011. [Online]. Available: http://www. tech radar.com/news/dig ital-home/and roid-home-what-you-need-to-know-955045. [Accessed Aug. 7, 2011].

Gogineni, S. et al., "Compressed LED Illumination Sensing," IEEE Signal Processing Letters, vol. 18, No. 10, Oct. 2011.

* cited by examiner

INTEGRATED OCCUPANCY AND AMBIENT LIGHT SENSORS

CROSS-REFERENCE TO RELATED APPLICATIONS

This Application is a continuation under 35 U.S.C. §120 of U.S. patent application Ser. No. 13/509,351 filed on May 11, 2012, now U.S. Pat. No. 9,253,857, which is the U.S. National Stage filing under 35 U.S.C. §371 of International Application Ser. No. PCT/US12/27660 filed on Mar. 5, 2012. The disclosures of U.S. patent application Ser. No. 13/509,351 and International Application No. PCT/US12/27660 are hereby incorporated by reference in their entireties.

BACKGROUND

Unless otherwise indicated herein, the materials described in this section are not prior art to the claims in this application and are not admitted to be prior art by inclusion in this section.

In some business and personal settings, electricity and other utility costs can be expensive. To address the high costs of electricity and other utilities, some entities adopt energy conservation polices for turning lighting and other energy-consuming devices off when not in use. Because employees and/or other occupants of a particular business or home may be unaware of such energy conservation policies, such policies may or may not be useful.

Some employers or homeowners install lighting control mechanisms. Such mechanisms often require installation of motion detectors or other devices. Such devices may be bulky, expensive, computationally intensive, and/or obtrusive. Furthermore, such devices often must be retrofitted, which can require expense not only in hardware costs, but also in installation and servicing costs.

SUMMARY

The present disclosure generally describes concepts and technologies for integrated occupancy and ambient light sensors. According to various embodiments of the concepts and technologies disclosed herein, one or more lighting devices can include illumination sources that can be activated to illuminate a room, structure, or outdoor area. The lighting devices can also include one or more light sensors, which can be integrated into the lighting device. The light sensors can be used to generate data, which can be output to a control module associated with and/or integrated within the lighting devices. The control module can be configured to apply compressive, sensing algorithms to the sensed data to generate light level data. As such, a single data point or a small or sparse set of data points obtained with a single or few light sensors can be used to generate a light level map, a histogram, or other set of light level data by applying one or more compressive sensing algorithms to interpret, and/or extrapolate the single or sparse data points.

The control module can also be configured to analyze the sensed data by applying occupancy, movement, ambient light and/or other algorithms to the light level data, or can output the light level data to other devices for analysis. The controller can be configured to receive the light level data and to apply various algorithms to the light level data to determine ambient light levels at or near the lighting device, to determine occupancy at or near the lighting device, to detect, movement at or near the lighting device, and/or to predict movement of entities detected at or near the lighting device. As used herein, the term "near" can refer to an area, point, or location that is within sensing range of a light sensor, within a field of view of the light sensor, within an illumination range of the lighting device, and/or otherwise in an area that can be illuminated by the illumination source or sensed or monitored by the light sensor. As such, the phrase "at or near," as used herein, can refer to any location, point in space, thing, or area that is in contact with the lighting device and/or within an illumination range of the lighting device or sensing range of the light sensor. The controller can also be configured to apply other algorithms or processes to the light level data for various purposes and/or to generate control data for controlling one or more lighting devices.

The controller, can be configured to transmit the control data to one or more of the lighting devices to control operation of the lighting devices. In some embodiments, the lighting devices can be configured to implement the control data by activating or deactivating an illumination source or a light sensor of the lighting device, by pulsing the illumination source and/or the light sensor, by dimming or undimming the illumination source and/or the light sensor, and/or by changing or maintaining other operational characteristics of the lighting device. As such, it can be appreciated that in some embodiments, ambient light levels and/or occupancy determinations made based upon data obtained by the lighting devices can be used to control operation of one or more lighting devices.

Some example computer-implemented methods for controlling operation of a lighting device including an illumination source and a light sensor are disclosed. Example methods can include determining if the illumination source is operating in an on mode of operation or an off mode of operation. In some embodiments, an on mode of operation can include an operation mode in which the illumination source is emitting light. In some other embodiments, an off mode of operation can include an operation mode in which the illumination source is not emitting light. Example methods can also include pulsing operation of the illumination source to the on mode of operation to generate a light pulse, in response to determining that the illumination source is operating in, an off mode of operation, and compressively sensing, using the light sensor, a light level associated with an area illuminated by the light pulse.

Some example computer readable media for controlling operation of a lighting device are disclosed. Example computer readable media can include computer executable instructions that, when executed by a computer, cause the computer to perform one or more operations. Some example computer executable instructions can cause the computer to determine if an illumination source of a lighting device is operating in an on mode of operation or an off mode of operation. The lighting device can include the illumination source, a light sensor, and a transceiver. Example computer executable instructions can cause the computer to determine that the illumination source is operating in the off mode of operation; to transmit, to the lighting device, an instruction to pulse operation of the illumination source to emit a light pulse; and to transmit to the lighting device an instruction to compressively sense, using the light sensor, a light level associated with an area illuminated by the light pulse. Example computer executable instructions can cause the computer to receive, from the lighting device, data indicating the light level compressively sensed by the light sensor.

Some example lighting systems including a lighting device, and a controller operable to be in communication with the lighting device are disclosed. Example lighting devices can include an illumination source and a light sensor. The controller can be configured to determine if the illumination source is operating in an on mode of operation or an off mode of operation. When the illumination source has been determined to be operating in the off mode of operation, the lighting device can generate an instruction to pulse operation of the illumination source to emit a light pulse and an instruction to measure, using the light sensor, a light level associated with an area illuminated by the light pulse. Example lighting devices can also be configured to transmit, to the lighting device, the instruction to pulse operation of the illumination source and the instruction to measure, and to receive, at the controller, data adapted to indicate the light level measured by the light sensor.

Some example lighting devices are also disclosed. Example lighting devices can include a housing, a light-emitting diode connected to the housing, and a receiver (photo) diode connected to the housing. In some embodiments, the light-emitting, diode and/or the receiver diode can be configured to connect to or communicate with a control module and/or a transceiver. Example lighting devices also can include diode amplification circuitry. The diode amplification circuitry can be configured for communication with, the light-emitting diode and/or the receiver diode. The diode amplification circuitry can be configured to convert a signal from the receiver diode and the control module, can be configured to receive the signal and output control data for controlling operation of the light-emitting diode. In some embodiments, the control module can be configured to output the control data to the transceiver.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
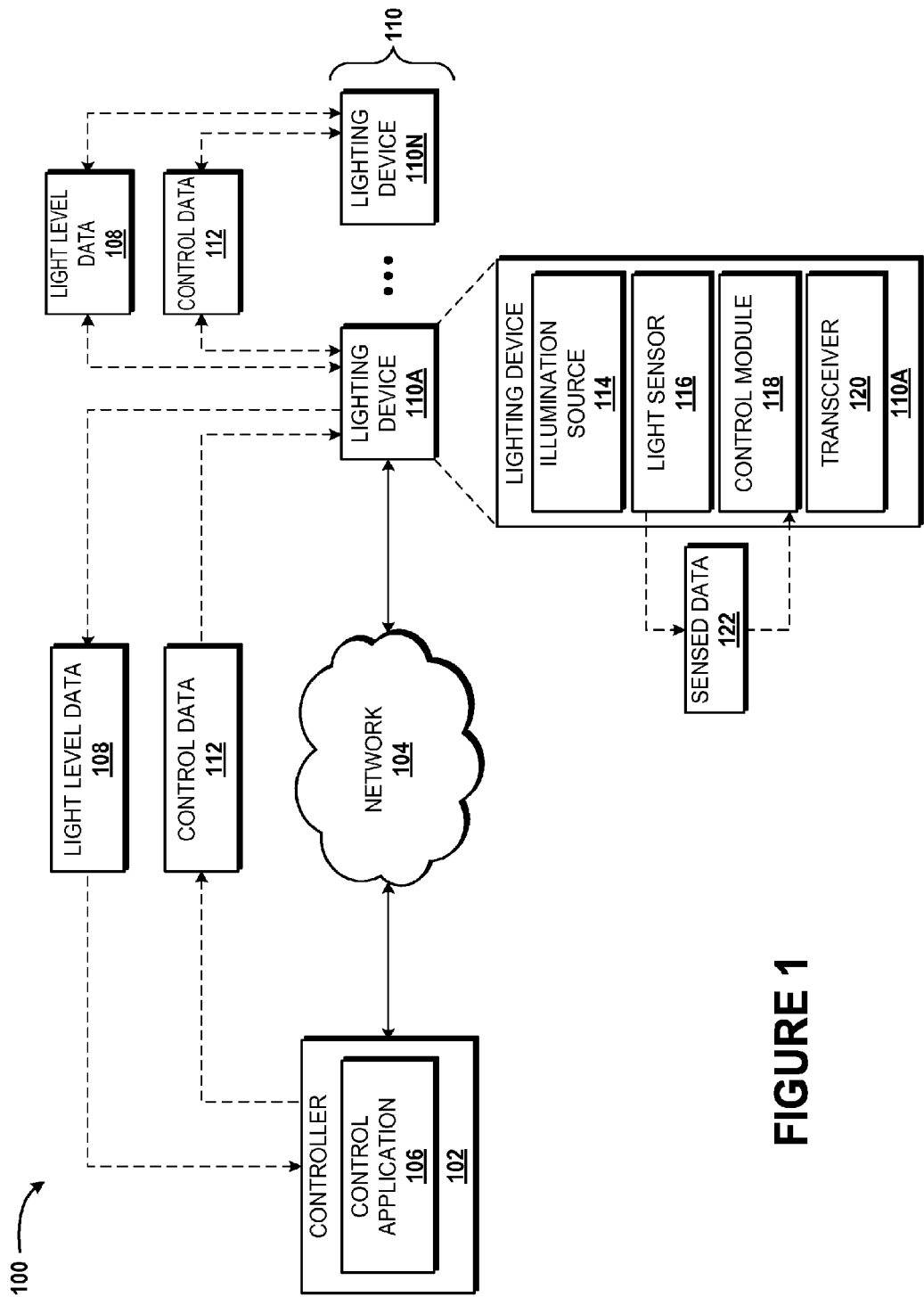
FIG. 1 is a block diagram illustrating a lighting system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

In the description of some of the FIGURES, text from the FIGURES is reproduced in the specification. To indicate reproduction of text from the FIGURES, the text from the FIGURES sometimes is placed within brackets. For example, a block that includes the text "example text" in the FIGURES may be reproduced in the description as "[example text]." As such, text within brackets should be understood as being reproduced from the respective FIGURE being described, and must not be construed as limiting the description thereof in any manner.

This disclosure is generally drawn, inter alia, to technologies for integrated occupancy and ambient light sensors. In an illustrative example, one or more lighting devices can be located at a room, building or other structure, or outdoor area. The lighting devices can include illumination sources that can be activated to illuminate the room, structure, or outdoor area. In some embodiments, the lighting devices can also include one or more light sensors, which can be integrated into the lighting device. The light sensors can be used to generate sensed data, which can be output to a control module, associated with and/or integrated, with the lighting devices. The control module can be configured to apply compressive sensing algorithms to the sensed data to generate light level data. The light level data can include, for example, light level maps, histograms, data points, or other forms of data.

The control module can be configured to analyze the sensed data by applying occupancy, movement, and/or ambient light algorithms to the light level data and/or can be configured to output the light level data to other devices for analysis. In some embodiments, the control module, can be configured to output the light level data to other lighting devices or one or more controllers, which can be configured to communicate with the lighting device via a wired or wireless transceiver that can be integrated within the lighting device. The controller can be configured to receive the light level data and to apply various algorithms to the light level data to determine ambient light levels at or near the lighting device, to determine occupancy at or near the lighting device, to detect movement at or near the lighting device, and/or to, predict movement of entities detected at or near the lighting device. The controller can also be configured to apply other algorithms or processes to the light level data for various purposes and/or to generate control data adapted to control one or more lighting devices.

The controller can be configured to transmit the control data to one or more of the lighting devices to control operation of the lighting devices. In some embodiments, the lighting devices can be configured to implement the control data by activating or deactivating an illumination source or a light sensor of the lighting device, by pulsing the illumination source and/or the light sensor, by dimming or undimming the illumination source and/or the light sensor, and/or by changing or maintaining other operational characteristics of the lighting device. As such, it can be appreciated that in some embodiments, ambient light levels and/or occupancy determinations made based upon data obtained by the lighting devices can be used to control operation of one or more lighting devices. Some such embodiments can be configured to use an integrated light sensor and existing illumination sources, without requiring additional hardware. These and other aspects of systems and methods for integrated occupancy and ambient light sensors will be described in more detail herein.

Referring now to FIG. 1, a block diagram illustrating a lighting system 100 arranged according to at least some embodiments presented herein will be described. As shown in FIG. 1, the lighting system 100 can include a controller 102. The functionality of the controller 102 can be provided by one or more computing devices such as, for example, a personal computer ("PC") such as a desktop computer, a laptop computer, or a tablet computer; a server computer; a mobile computing device such as a smartphone, a personal digital assistant ("PDA"), or the like; a control system for a room, home, office, business, or other location; a set-top box ("STB") or set-top unit ("STU"); a gaming console, gateway, router, or other home networking and/or computing device; combinations thereof; and/or other devices. In, some embodiments, the controller 102 can be configured to operate as part of, or in communication with, one or more communications networks ("network") 104, though this is not necessarily the case.

The controller 102 can be configured to execute an operating system (not illustrated) and one or more software programs, applications, modules, and/or other computer-executable instructions such as a control application 106. The operating system can include an executable program adapted to control the operation of the controller 102. The control application 106 can include an application program configured for execution on top of the operating system to control various components of the lighting system 100 and/or to provide the functions described herein with respect to the controller 102, which are set forth in detail below.

In particular, the controller 102 can be configured to execute the control application 106 to receive or otherwise obtain light level data 108. In some embodiments of the lighting system 100, the light level data 108 can be generated by one or more lighting devices with integrated occupancy and/or ambient light sensors ("lighting devices") 110A-N (hereinafter collectively and/or generically referred to as the "lighting devices 110"). The light level data 108 can include data corresponding to light levels and/or other data observed at the lighting device 110, as will be more clearly understood below with reference to the description of the lighting device 110. Additionally, or alternatively, the light level data 108 can correspond to one or more light level maps, which can be generated by one or more of the lighting devices 110. It should be understood that these embodiments are illustrative, and should not be construed as being limiting in any way.

The controller 102 can also be configured to execute the control application 106 to generate control data 112 adapted to control operation of the lighting devices 110. In particular, the control application 106 can be configured to analyze the light level data 108 and to determine, based upon analyzing the light level data 108, if operation of the lighting device 110 is to be modified in one or more of various ways. For example, the control data 112 can instruct the lighting device 110 to operate in a dimmed mode, in a non-dimmed mode, in an off mode, in an on mode, and/or to pulse operation modes between two or more of these and/or other operation modes. Thus, according to various embodiments, the control data 112 can correspond to analog and/or digital signals or parameters for controlling operation of the lighting device 110. The various operation modes of the lighting device 110 and control of the lighting device 110 using the control data 112 are described in more detail below.

As shown in FIG. 1, some embodiments of the lighting devices 110 include various components including, but not limited to, an illumination source 114, a light sensor 116, a control module 118, and/or a transceiver 120. It should be understood that although the illumination source 114, the light sensor 116, the control module 118, and the transceiver 120 are illustrated in FIG. 1 as being included only within the lighting device 110A, each of the lighting devices 110 can include some, all, or none of these and/or other components. As such, the illustrated lighting device 110A should be understood as illustrative of one contemplated embodiment of one or more of the lighting devices 110.

In some embodiments, the functionality of the illumination source 114 can be provided by one or more and/or a combination of light emitting diodes ("LEDs"), incandescent lighting devices, fluorescent lighting devices, compact fluorescent lighting devices ("CFLs"), and/or other lighting or illumination devices. According to various embodiments of the lighting devices 110, the functionality of the illumination source 114 can be provided by one or more LEDs. The LEDs can be similar to one another or varied with respect to one another in terms of size, wattage, color, power, output, or other LED characteristics. Because other types of lighting devices can be used to provide the functionality of the illumination source 114, it should be understood that these embodiments are illustrative, and should not be construed as being limiting in any way.

The illumination source 114 can be configured to illuminate an area such as a room, building, landscaping, outdoor area, or the like. According to some embodiments of the concepts and technologies disclosed herein, the illumination source 114 can also be configured to generate light for use in determining occupancy and/or ambient light levels at or near the lighting device 110. In particular, various embodiments of the concepts and technologies disclosed herein can generate pulses of the illumination source 114. For example, the illumination source 114 can be pulsed "on" by pulsing the illumination source 114 from an off mode of operation to an on mode of operation, and from the on mode of operation back to the off mode of operation. Such an "on" pulse can persist for various time periods such as, for example, one or more microseconds or portions thereof, one or more seconds or portions thereof, and/or other time periods. Similarly, the illumination source 114 can be pulsed "off" by pulsing the illumination source 114 from the on mode of operation to the off mode of operation, and from the off mode of operation back to the on mode of operation. These "off" pulses can persist for various time periods as well.

The pulses of the illumination source 114 can also include pulses between various dim levels, brightness levels, colors, and/or other operational characteristics in addition to, or instead of the on and off modes described above. The various pulses described herein can be repeated according to various schedules, time delays, or other considerations. For example, in some embodiments, the illumination source 114 can be operated in an off mode of operation and can be pulsed on for about five microseconds before being returned to the off mode of operation. Such pulses can be repeated once per second, once every five seconds, once every ten seconds, and/or at other regular or irregular intervals. Similarly, the illumination source 114 can be pulsed on, as explained above, for similar or different periods and/or at similar or different intervals. It should be understood that these embodiments are illustrative, and should not be construed as being limiting in any way. Various purposes of the pulses will be more clearly understood with reference to the light sensor 116, which is described below.

The light sensor 116 can be configured to measure the presence or absence of light, light intensity, wavelength, color, and/or other aspects of detected light. In some embodiments, operation of the illumination source 114 can be pulsed, as described above, and the light sensor 116 can be configured to measure light before, during, and/or after the pulses of the illumination source 114. The light sensor 116 can also be configured to output data sensed by the light sensor 116 as sensed data 122. According to some other embodiments, operation of the light sensor 116 can be pulsed instead of and/or in addition to the illumination source 114. Thus, the light sensor 116 can be configured to generate the sensed data 122 when the illumination source 114 is on, off, dimmed, undimmed, outputting various colors, and/or otherwise operated as disclosed herein.

In some embodiments, the light sensor 116 can include circuitry, modules, applications, devices, or network connections including, but not limited to, the controller 102 and the control module 118. In other embodiments, the light sensor 116 can be configured to output the sensed data 122 to the circuitry. For example, the light sensor 116 can include and/or can be communicatively coupled to amplification circuitry. In some embodiments, the functionality of the light sensor 116 can be provided by a receiver diode, and the functionality of the amplification circuitry can be provided by diode amplification circuitry. The diode amplification circuitry can include an alternating current ("AC") coupling, variable gain amplification ("VGA") circuitry, filtering circuitry, an analog-to-digital converter ("ADC"), additional analogue or digital processing circuitry, and/or other components.

Some, all, or none of the diode amplification circuitry components can be housed within a housing of the lighting device 110. In some embodiments, the diode amplification, circuitry can be disposed to a printed circuit board ("PCB") and attached to or otherwise located within the housing. The diode amplification circuitry can be configured to receive the sensed data 122 from the light sensor 116, and to apply, via various hardware and/or software, one or more compressive sensing algorithms to the sensed data 122 to generate the light level data 108 as described in more detail herein. As mentioned above, the compressive sensing algorithms can be used to extrapolate and/or interpret a single data point or sparse data points to obtain a full data set that can be used to generate, for example, a histogram a light level map, or other representation of lighting information at or near the lighting device 110. In some other embodiments, the diode amplification circuitry can be configured to amplify the sensed data 122 and/or to convert the sensed data 122 from analog-to-digital and/or digital-to-analog, and to pass the converted and/or amplified data to the control module 118. It should be understood that these embodiments are illustrative, and should not be construed as being limiting in any way.

While the light sensor 116 has been referred to in the above embodiments as a receiver diode, it should be understood that these embodiments are illustrative. In particular, the functionality of the light sensor 116 can be provided by one or more alternative devices. In some embodiments, for example, the functionality of the light sensor 116 can be provided by one or more cameras, infrared ("IR") sensors, ambient light sensors, photovoltaic devices, ultrasound devices, or other devices or sensors that can be configured to, sense light levels as described herein. Thus, while the description herein describes the light sensor 116 in various embodiments of the lighting system 100 as a receiver diode, it should be understood that these embodiments are illustrative, and should not be construed as being limiting in any way.

The control, module 118 can be configured to receive the sensed data 122 from the light sensor 116 and/or from the amplification circuitry (if included or integrated as part of the light sensor 116). The control module 118 can also be configured to analyze the sensed data 122 and to generate the light level data 108. The control module 118 can generate the light level data 108 by applying one or more algorithms to the sensed data 122. In some embodiments, the control module 118 can apply one or more compressive sensing algorithms to the sensed data 122 to generate the light level data 108. Thus, for example, if the sensed data 122 includes sparse data points, the control module 118 can be configured to apply one or more compressive sensing algorithms to extrapolate between sparse data points and/or to otherwise generate a set of data that includes more data points than are contained in the sensed data 122. In some example embodiments of the lighting system 100, the compressive sensing algorithm can be applied to the sensed data 122 to generate a light level map from a single measured input from the light sensor 116, as will be illustrated and described below with reference to FIGS. 4 and 5. It should be understood that these embodiments are illustrative, and should not be construed as being limiting in any way.

The control module 118 can also be configured to output the light level data 108 to the controller 102 and/or to other lighting devices 110, as will be explained in more detail herein. In some embodiments, the control module 118 can output the light level data 108 via the transceiver 120. The control module 118 can also be configured to control operation of the lighting device 110. For example, some, all, or none of the functionality described herein with respect to the controller 102 and/or the control, application 106 can be provided by some embodiments of the control module 118. As such, it can be appreciated that the control module 118 can be configured to generate the control data 112 at the lighting device 110 in addition to, or instead of outputting the light level data 108 to the controller 102 and/or receiving the control data 112 from the controller 102. The generation of the light level data 108 and/or the control data 112, as well as controlling operation of the lighting device 110, are described in more detail below, particularly with reference to FIGS. 6-7.

The transceiver 120 can be configured to send and/or receive data from or at the lighting device 110. For example, the transceiver 120 can be configured to send the light level data 108 to the controller 102 and/or other devices, to receive the control data 112 from the controller 102 and/or other devices, and/or to send the light level data 108 and/or the control data 112 to other lighting devices 110. Because the transceiver 120 can be configured to complete other communications, it should be understood that these embodiments are illustrative, and should not be construed as being limiting in any way.

According to various embodiments, the functionality of the transceiver 120 can, be provided by one or more wired or wireless devices. In some embodiments, the functionality of, the transceiver 120 can be provided by one or more wired interfaces including, but not limited to, controllers and/or hardware associated with one or more USB ports, mini-USB ports, IEEE 1394 ("FIREWIRE") ports, serial ports, parallel ports, RJ48 ("Ethernet") ports, RJ11 ("telephone") jacks, coaxial connectors, and/or other wired interfaces. The functionality of the transceiver 120 can also be provided by one or more wireless interfaces including, but not limited to, controllers and/or hardware associated with one or more WIFI transceivers, BLUETOOTH transceivers, ZIGBEE transceivers, Infrared Data Association ("IrDA") transceivers, radio-frequency identification ("RFID") or near field communications ("NFC") transceivers, WIMAX transceivers, cellular transceivers, and/or other wireless transceivers. Because the functionality of the transceiver 120 can be provided by other types of transceivers and/or combinations of wireless and wired transceivers, it should be understood that these embodiments are illustrative, and should not be construed as being limiting in any way.

According to various embodiments of the concepts and technologies disclosed herein, one or more lighting devices 110 can be installed or otherwise located at a particular room, building or other structure, or outdoors for illumination. The lighting devices 110 can include one or more integrated light sensors such as the light sensors 116, which can be used to generate light data such as the sensed data 122, and to output the sensed data 122 to the control module 118 associated with the lighting devices 110. The control module 118 can be configured to apply compressive sensing algorithms to the sensed data 122 to generate the light level data 108, which can include, for example, light level maps, histograms, or the like. The light level maps are described in more detail below, particularly with reference to FIGS. 4 and 5. The control module 118 can further analyze the sensed data 122 by applying occupancy, movement, and/or ambient light algorithms, or can output the light level data 108 to other devices such as other lighting devices 110 or one or more controllers 102, which can communicate with the lighting device 110 via the transceiver 120.

The controller 102 can be configured to receive the light level data 108 and/or multiple versions of the light level data 108. The controller 102 can also be configured to apply various algorithms to the light level, data 108 to determine ambient light levels at or near the lighting device 110, to determine occupancy at or near the lighting device 110, to detect movement at or near the lighting device 110, and/or to predict movement of entities detected at or near the lighting device 110. The controller 102 can be configured to apply other algorithms or processes to the light level data 108 for various purposes, and to generate control data 112 for controlling the lighting device 110.

The controller 102 can transmit the control data 112 to one or more of the lighting devices 110 to control operation of the lighting devices 110. In some embodiments, the lighting devices 110 can implement the control data 112 by activating or deactivating the illumination source 114 or the light sensor 116 of the lighting device 110, by pulsing the illumination source 114 and/or the light sensor 116, by dimming or undimming the illumination source 114, and/or by changing or maintaining other operational characteristics of the lighting device 110 or the light sensor 116. As such, it can be appreciated that in some embodiments of the lighting devices 110, ambient light levels and/or occupancy can be used to control operation of a lighting device 110 by using an, integrated light sensor 116 and existing illumination sources 114, without requiring additional hardware to be installed at the room, building, structure, or other area. It should be understood that these embodiments are illustrative, and should not be construed as being limiting in any way.

FIG. 1 illustrates one controller 102, one network 104, and multiple lighting devices 110. It should be understood, however, that some implementations of the lighting system 100 include multiple controllers 102, multiple networks 104, or one or multiple lighting devices 110. As such, FIG. 1 should be understood as being illustrative of one example of the lighting system 100 and should not be construed as being limiting in, any way.

Figure 2:
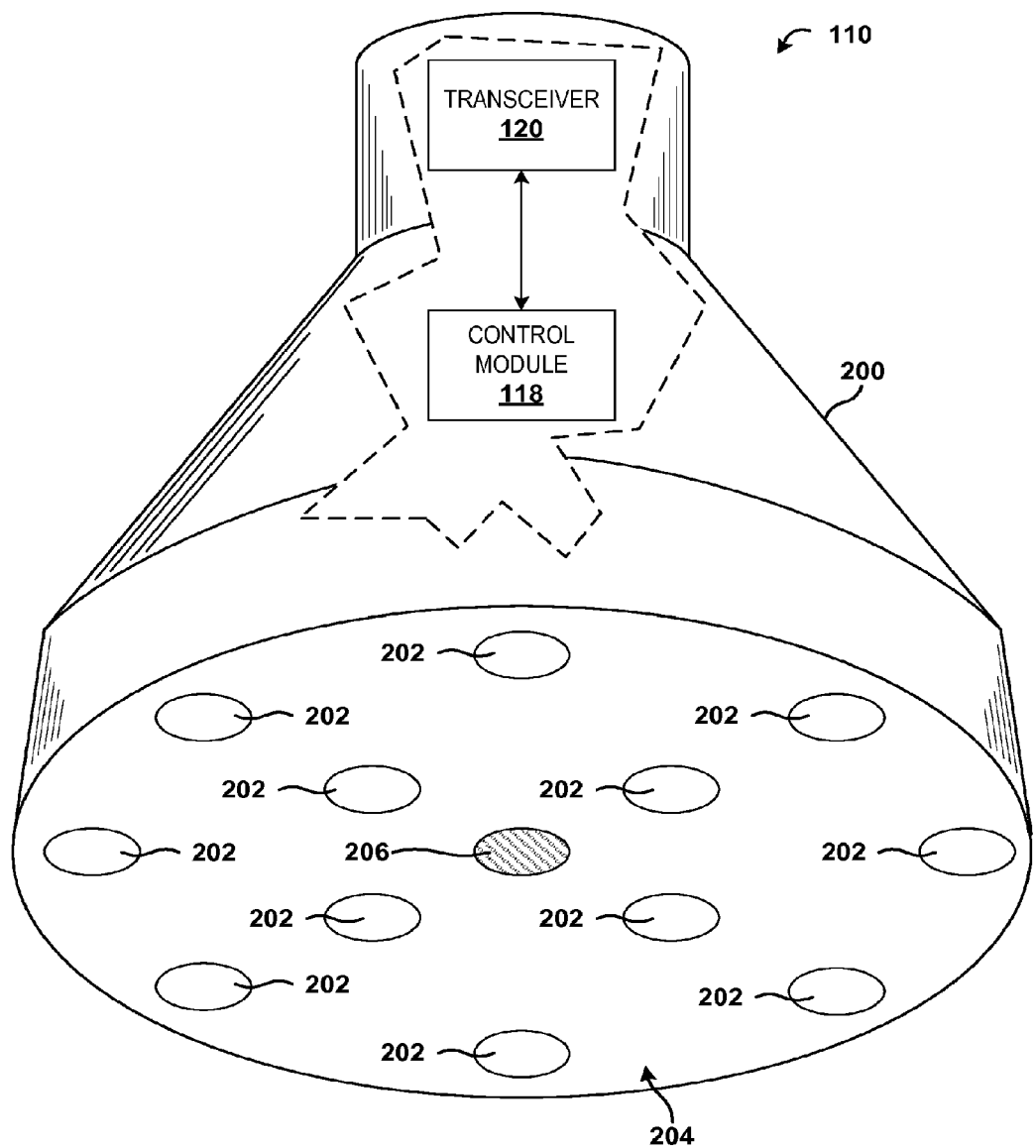
FIG. 2 is a line diagram illustrating an illustrative lighting device.

Turning now to FIG. 2, additional aspects of the concepts and technologies disclosed herein for integrated occupancy and ambient light sensors will be described in detail. In particular, FIG. 2 is a line diagram illustrating an illustrative lighting device 110, arranged according to at least some embodiments presented herein. As shown in FIG. 2, the lighting device 110 can include a housing 200. The housing 200 can be formed from various materials including, but not limited to metals and alloys; epoxies; fiberglass; ceramics; plastics and other polymers such as various thermoplastics, thermosets, acrylics, or the like; glass; combinations thereof or the like. According to various embodiments, the housing 200 can be used to contain the various components illustrated in FIG. 1 and additional and/or alternative components such as lenses, electrical and/or mechanical connection mechanisms, or the like. It should be understood that FIG. 2 illustrates one example of the housing 200, and therefore FIG. 2 should not be construed as being limiting in any way.

As illustrated in FIG. 2, the lighting device 110 can also include a number of LEDs 202, one or more of which can be configured to provide the functionality of the illumination source 114 described above with respect to FIG. 1. Although the LEDs 202 are illustrated as being in a substantially planar arrangement, relative to a bottom surface 204 of the housing 200, it should be understood that additional and/or alternative arrangements are possible and are contemplated. In particular, the LEDs 202 can be arranged on various structures or surfaces that are not illustrated in FIG. 2. Additionally, or alternatively, while FIG. 2 depicts twelve LEDs 202, it should be understood that this is one example embodiment of the lighting device 110 and that any number of LEDs 202 or even a single LED 202 can be used instead. In particular, the LEDs 202 can be arranged such that more than twelve or fewer than twelve LEDs 202 can be included in the lighting device 110. As such, the illustrated arrangement and number of LEDs 202 is illustrative, and should not be construed as being limiting in any way.

In various embodiments, the lighting device 110 can include a receiver diode 206, which can be configured to provide the functionality of the light sensor 116 described above with reference to FIG. 1. Although FIG. 2 illustrates a single receiver diode 206, it should be understood that multiple receiver diodes 206 can be included in the lighting device 110. Furthermore, the arrangement of the receiver diode 206 at the approximate center of the bottom surface 204 as illustrated in FIG. 2 is illustrative and should not be construed as being limiting in any way.

As shown in FIG. 2, the lighting device 110 can include various hardware and/or software discussed above with respect to FIG. 1. For example, the lighting device 110 can include the control module 118 and the transceiver 120 in addition to the LEDs 202 and the receiver diode 206, which can provide the functionality of the illumination source 114 and the light sensor 116, respectively. It therefore can be appreciated that the embodiments of the lighting device 110 including the configuration of the lighting device 110 illustrated in FIG. 2 can be used in place of other lighting devices to provide the functionality described herein for an integrated occupancy and ambient light sensor.

Figure 3:
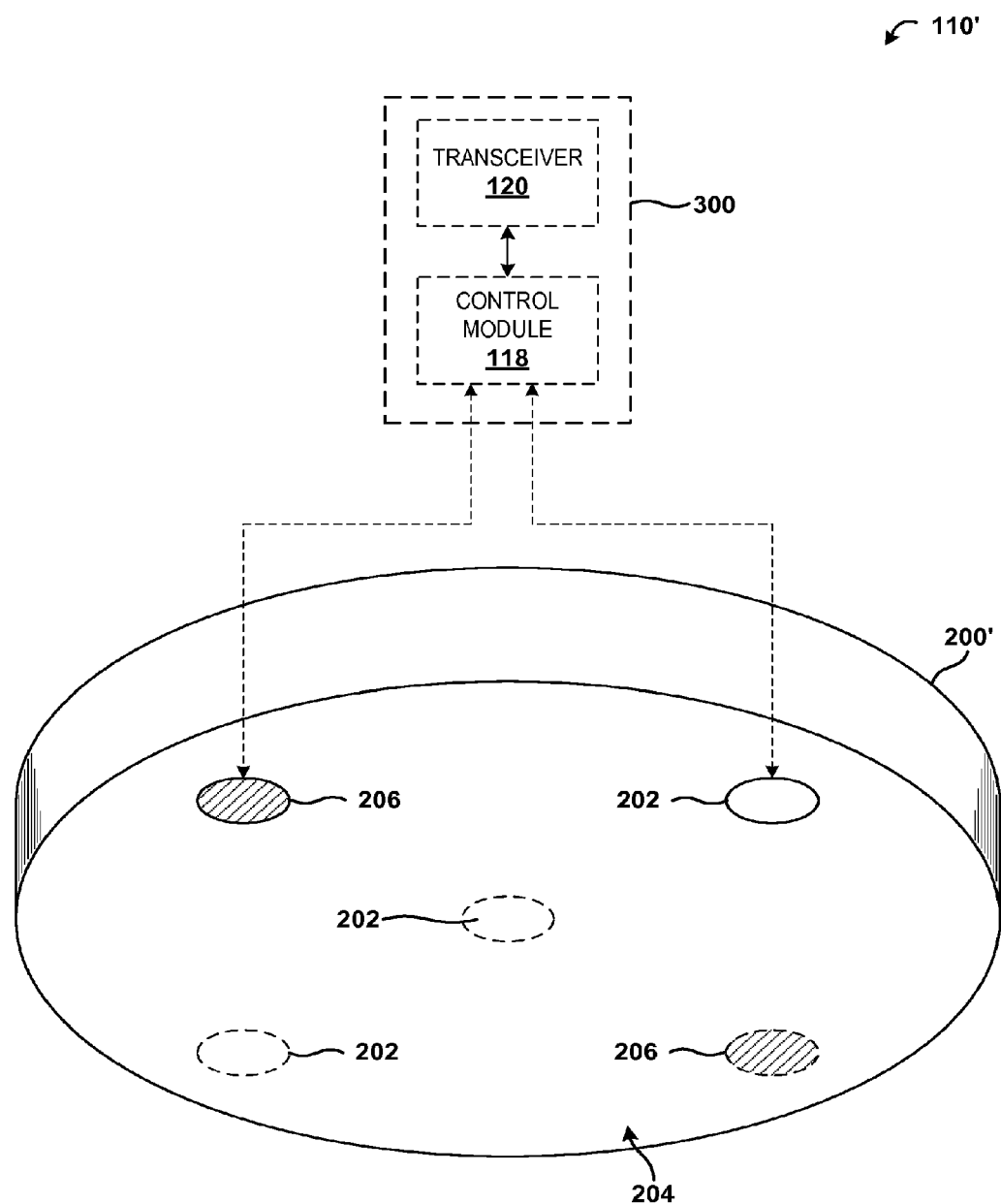
FIG. 3 is a line diagram illustrating another illustrative lighting device.

Turning now to FIG. 3, additional aspects of the concepts and technologies disclosed herein for integrated occupancy and ambient light sensors will be described in detail. In particular, FIG. 3 is a line diagram illustrating another illustrative lighting device 110', arranged according to at least some embodiments presented herein. As shown in FIG. 3, the lighting device 110' can include a housing 200'. The housing 200' of the lighting device 110' can be, but is not necessarily, similar or even identical to the housing 200 described above with respect to FIG. 2. As such, the housing 200' can be formed from various rigid, semi-rigid, or flexible materials and/or combinations of materials including, but not limited to, metals; alloys; epoxies; fiberglass; ceramics; plastics or other polymers such as thermoplastics, thermosets, acrylics, or the like; glass; combinations thereof; or the like. According to various embodiments, the housing 200' can be used to support, hold, and/or contain the various components of the lighting device 110'. The housing 200' also can include, support, hold, and/or contain lenses, electrical and/or mechanical connection mechanisms, or the like. It should be understood that FIG. 3 illustrates one example of the housing 200', and therefore FIG. 3 should not be construed as being limiting in any way.

As illustrated in FIG. 3, the lighting device 110' can include an LED 202, which can be configured to provide the functionality of the illumination source 114 described above with respect to FIG. 1. Also, as shown in FIG. 3, the lighting device 110' can include additional LEDs 202 or other illumination sources 114. Although the LED 202 is illustrated as being located on a substantially planar mounting surface such as the bottom surface 204 of the housing 200, it should be understood that additional and/or alternative arrangements are possible and are contemplated, as explained above with reference to FIG. 2. As such, the illustrated arrangement should be understood as being illustrative of one contemplated embodiment of the lighting device 110', and should not be construed as being limiting in any way.

In various embodiments, the lighting device 110 can include a receiver diode 206, which can be configured to provide the functionality of the light sensor 116 described above with reference to FIG. 1. As shown in FIG. 3, the lighting device 110' can include a single receiver diode 206 and/or more than one receiver diodes 206, as shown in dashed lines in FIG. 3. Thus, the embodiment illustrated in FIG. 3 is illustrative and should not be construed as being limiting in any way.

In the embodiment shown in FIG. 3, the LED 202 and/or the receiver diode 206 of the lighting device 110' can be configured to connect to or communicate with other hardware. For example, the LED 202 and/or the receiver diode 206 can be configured to communicate with the control module 118 and via the control module 118, the transceiver 120. Although not shown in FIG. 3, the LED 202 and/or the receiver diode 206 also can be configured to communicate directly with the transceiver 120 in some embodiments. In the embodiment shown in FIG. 3, the control module 118 and/or the transceiver 120 can be attached to, included within, and/or otherwise housed in the housing 200' (similar to the embodiment shown in FIG. 2), or within a control housing 300 or other housing, attachment surface, or other structure for holding, storing, containing, or otherwise supporting the control module 118 and/or the transceiver 120.

In an alternative embodiment, the receiver diode 206 may be replaced with a more sophisticated imaging device, such as a digital camera (as are commonly used in cell phones) or other image capturing technology. In still another embodiment, multiple receiver diodes may be used to capture light level data from more than one angle, using time sensing data for each receiver diode similar to an array.

In the embodiment shown in FIG. 3, the lighting device 110' can be assembled by mating, attaching, assembling, or otherwise connecting the housing 200' to the control housing 300. As such, the control housing 300 can be joined the housing 200' to form the lighting device 110'. Furthermore, the embodiment shown in FIG. 3 can be used to allow manufacturing of the various components of the lighting device 110' at different locations. In one contemplated embodiment, a customer or manufacturer assembles the housing 200' and the control housing 300. Also, the embodiment shown in FIG. 3 can enable replacement of part of the lighting device 110' in the event of a component failure without replacing the entire lighting device 110'. Thus, for example, the housing 200' or the control housing 300 can be replaced for maintenance, to upgrade one or more components of the lighting device 110', and/or for other reasons. Thus, although not visible in FIG. 3, the housing 200' and the control housing 300 can include various mechanical structures to enable mating or connection of the housing 200' and the control housing 300.

Similarly, the housing 200' and the control housing 300 can include various electrical or networking connections to enable electrical and/or data connections between the various components of the lighting device 110'. It should be appreciated that the illustrated shape, size, and configuration of the lighting device 110', as well as the various components thereof, are illustrative, and that other shapes, sizes, configurations, and/or components can be included or substituted for those illustrated in FIG. 3. As such it should be understood that the embodiment shown in FIG. 3 is illustrative, and should not be construed as being limiting in any way.

In some embodiments illustrated in FIG. 2 or 3, the lighting device may be a "light bulb" suitable for use in any light fixture, designed to accommodate and/or power a light bulb. The lighting device may be adapted to replace any existing light generating device "light bulb" available in the market place, or may be a specific purpose built light generating device "custom light bulb."

Figure 4:
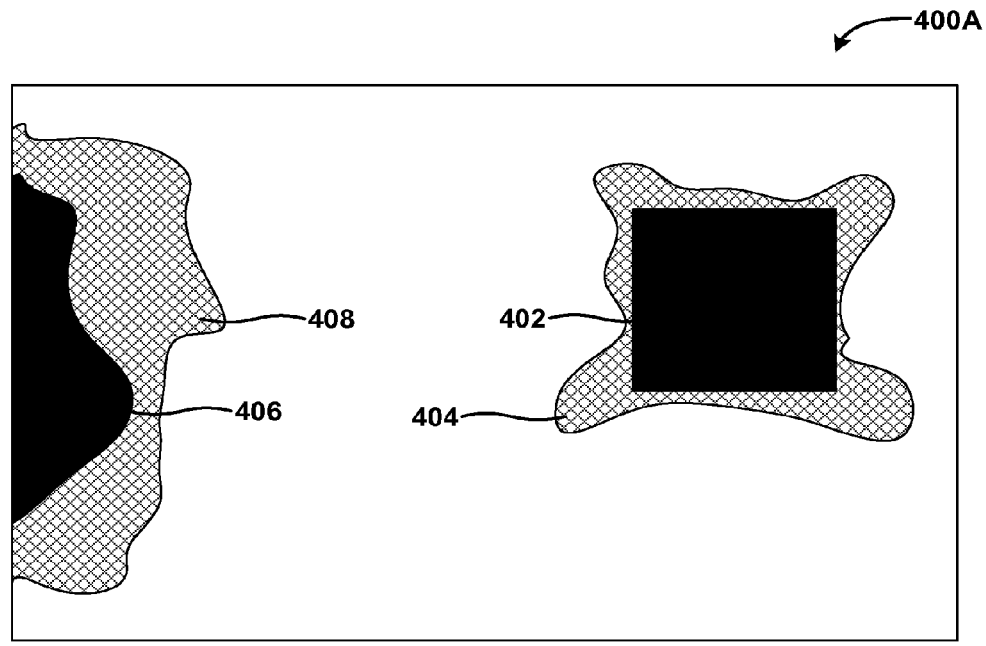
FIGS. 4 and 5 are line, drawings schematically illustrating light level data.
Figure 5:
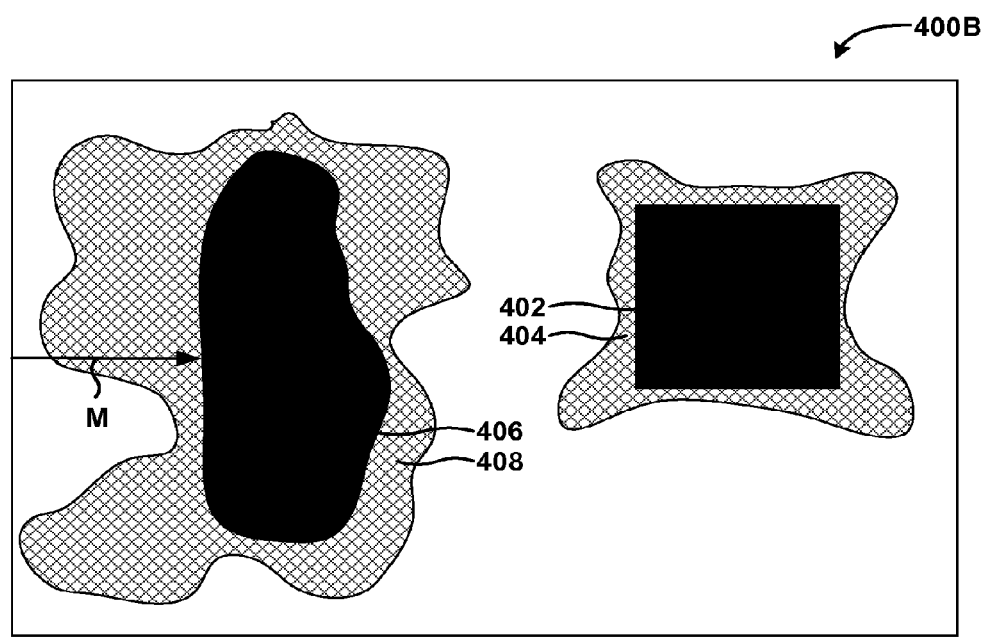

FIGS. 4 and 5 illustrate additional aspects of the concepts and technologies disclosed herein for integrated occupancy and ambient light sensors. In particular, FIGS. 4 and 5 are line drawings schematically illustrating the light level data 108, arranged according to at least some embodiments presented herein. Referring first to FIG. 4, a light level map 400A is shown. The light level map 400A can correspond to various types of representations of the sensed data 122, which as described above can be modified by various compressive sensing algorithms to generate the light level map 400A shown in FIG. 4. As such, sparse data points obtained by the light sensor 116 can, upon application of the compressive sensing algorithms by the control module 118 and/or the controller 102, be used to generate the light level map 400A and/or other representations of the sensed data 122. As illustrated in FIG. 4, the light level map 400A can include a first region 402, which can correspond to a mass of a first entity. It, should be understood that the illustrated light, level map 400A in FIG. 4 is illustrative.

In the example embodiment shown in FIG. 4, the first region 402 can correspond to a first entity such as a table, a chair, a desk, or other approximately square structure that is within a field of vision of the light sensor 116. As, such, when light from the illumination source 114 strikes the first entity, the light is reflected and can be sensed by the light sensor 116. As shown, a second region 404 can surround the first region 402 and can correspond, in some embodiments, to a falloff region. The falloff region can correspond to light reflected by the first entity to surrounding structures or masses such as a floor or the like. It should be understood that this embodiment is illustrative, and should not be construed as being limiting in any way.

The light level map 400A can further include a third region 406 and a fourth region 408. In some embodiments, the third region 406 can correspond to a second entity such as a person, animal, device, or any other entity within the field of vision of the light sensor 116. As shown, the fourth region 408 can surround the third region 406 and can correspond, in some embodiments, to a second falloff region. The second falloff region depicted as the fourth region 408 can correspond to light reflected by the second entity to surrounding structures or masses. It should be understood that these embodiments are illustrative, and should not be construed as being limiting in any way.

According to some embodiments, the light level data 108 output by the lighting device 110 can include, data for rendering or otherwise representing the light level map 400A. Thus, the light level data 108 can indicate light levels in the field of vision of the light sensor 116, approximate or actual locations of entities in the field of vision of the light sensor 116, and/or other information that can be interpreted by the control module 118 and/or the controller 102 to determine occupancy and/or ambient light levels at or near the lighting device 110. Additionally, as explained above, the lighting device 110 can be configured to obtain multiple versions of the light level data 108 and to provide these multiple versions of the light level data 108 to the control module 118 and/or the controller 102 for various purposes, as disclosed herein.

Turning now to FIG. 5, additional aspects of the concepts and technologies disclosed herein for integrated occupancy and ambient light sensors will be described. As shown in FIG. 5, the first region 402 and the second region 404 are illustrated in substantially similar locations and arrangements, relative to the arrangement shown in FIG. 4, though the shape and intensity of the first region 402 and/or the second region 404 are illustrated as changing slightly. Such slight changes can be the result of interference, noise, or other fluctuations that affect the sensed data 122 and not necessarily due to movement of other changes to the first entity. The third region 406 and the fourth region 408 are illustrated as having moved relative to their respective positions in the light level map 400A. This movement of the third region 406 and the fourth region 408 can correspond to movement of the second entity into or through the field of vision of the light sensor 116. For example, the second entity can correspond to a person who has walked into the field of vision of the light sensor 116. It should be understood that these embodiments are illustrative, and should not be construed as being limiting in any way.

In some embodiments, the control module 118 and/or the controller 102 can be configured to compare a first version of the light level data 108 such as the light level map 400A to a second version of the light level data 108 such as the light level map 400B. By comparing multiple versions of the light level data 108, the control module 118 and/or the controller 102 can identify movement of entities within the field of vision of the light sensor 116. In, some embodiments, the control module 118 and/or the controller 102 can identify, via comparison of the light level map 400B and the light level map 400A, a movement vector M or other data for indicating movement and/or a direction of movement of the second entity. It should be understood that the calculation and/or identification of a movement vector such as the movement vector M is illustrative. In particular, the control module 118 and/or the controller 102 can identify movement of entities without explicitly identifying movement vectors or other indicators of movement. Thus, this example is illustrative of the concepts and technologies disclosed herein for identifying entities in the field of vision of the light sensor 116 and/or determining if the entities are moving. This data can be used by the control module 118 and/or the controller 102 to control operation of the lighting device in response to presence or movement of the entities, as will be explained in more detail below. Additionally, as mentioned above, the light level maps 400A, 400B can be used to determine ambient light levels in addition to, or instead of, presence or movement of the entities.

Alternatively, the light level maps described herein may make use of more comprehensive light or image comparing technologies, such as pixel-to-pixel comparison of light levels or color levels (using actual digital image capture devices in conjunction with or in place of a receiver diode). In some other embodiments, multiple light receiver diodes or image capture devices may be used to provide light level compensation data, image compensation data or light level/image capture data averaging. In still some other embodiments, the light receiver diode may be enhanced using a photomultiplier tube (PMT) (not shown).

Figure 6:
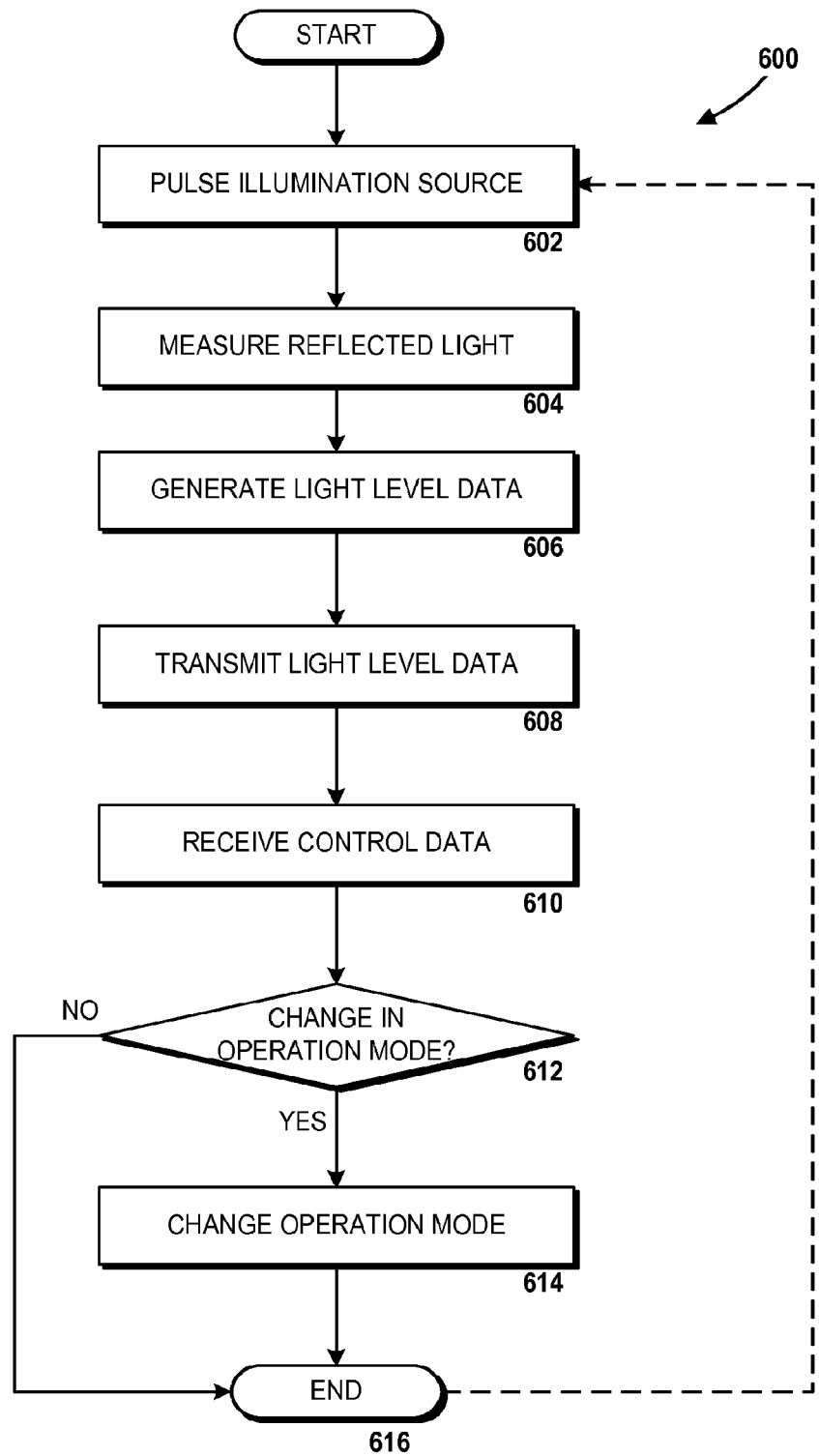
FIG. 6 is a flow diagram illustrating an example process for operating a lighting device.

Turning now to FIG. 6, a flow diagram illustrating an example process 600 for operating a lighting device, arranged according to at least some embodiments presented herein, will be described. It should be understood that the operations of the processes described herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated processes can be ended at any time and need not be performed in its entirety. Some or all operations of the processes, and/or substantially equivalent operations, can be performed by execution of computer-readable instructions included on a computer storage media, as defined herein. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like. The computer-readable instructions also can be implemented on mobile computing devices such as cellular telephones, smart phones, tablet or slate computers, personal digital assistants ("PDAs"), as well as other computing devices such as set-top boxes, embedded control systems, or the like, which can be loaded with and/or reprogrammed to execute the computer-readable instructions. Additional examples of computing devices are disclosed herein, and as such, these examples of computing devices should not be construed as being limiting in any way.

For purposes of illustrating and describing the concepts of the present disclosure, the process 600 is described as being performed by the lighting device 110. In some embodiments, the lighting device 110 can perform the process 600 via execution of one or more application programs such as the control module 118. It should be understood that this embodiment is illustrative, and should not be viewed as being limiting in any way. Furthermore, as explained above with reference to FIG. 1, the controller 102 can communicate with one or more of the lighting devices 110 and can be configured to perform some or all of the operations described herein with reference to FIG. 6 via execution of the control application 106. As such the described embodiment should be understood as being illustrative and should not be construed as being limiting in any way. The process 600 can include various operations, functions, or actions as illustrated by one or more blocks 602-616.

The process 600 begins at block 602 [pulse illumination source], wherein the lighting device 110 can be configured to pulse the illumination source 114. In some embodiments, the lighting device 110 can be configured to pulse the illumination source 114 according to a schedule or based upon other considerations, as explained above. In some other embodiments, the lighting device 110 can be configured to pulse the illumination source 114 in response to receiving instructions such as the control data 112 from the controller 102. As noted above, the lighting device 110 can communicate with the controller 102 and/or the control application 106 via a network adapter of the controller 102, a wired or wireless link between the lighting device 110, and/or the transceiver 120.

As explained above, the control module 118 and/or the control application 106 can pulse the illumination source 114 or generate instructions to pulse the illumination source 114. The illumination source 114 can be pulsed from an on mode of operation to an off mode of operation and back to the on mode of operation. Similarly, the illumination source 114 can be pulsed from an off mode of operation to an on mode of operation and back to the off mode of operation. The illumination source 114 can also be pulsed to and/or between other operation modes such as, for example, a dimmed operation mode, a full intensity operation mode, various color operation modes, and/or the like, as explained above. According to various embodiments, the pulses can persist for various time periods including one or more microseconds or, portions thereof, one or more seconds or portions thereof, and/or other time periods. In some embodiments, the illumination source 114 can be pulsed on while the illumination source 114 is operating in an off mode of operation. The illumination source 114 can be pulsed on for a time that may be unnoticeable to human observers. As such, a dark room or area can be illuminated by the illumination source 114 without being visible to a human observer.

In some other embodiments, the illumination source 114 can be pulsed off while the illumination source 114 is operating in an on, mode of operation. The illumination source 114 can be pulsed off for a time that may be unnoticeable to human observers. As such, a room or area illuminated by the illumination source 114 can appear to be illuminated continuously, though the illumination source 114 may be pulsed off periodically. According to various embodiments, the pulse lengths and/or schedules can be selected such that the pulses may be unobservable by some human observers. It should be understood that these embodiments are illustrative, and should not be construed as being limiting in any way.

Although not shown in FIG. 6, it should be understood that in some embodiments, the light sensor 116 can be pulsed instead of, or in addition to the illumination source 114. As such, the block 602 can be omitted, in some embodiments, and/or can be supplemented or replaced with an operation for pulsing operation of the light sensor 116. As such, FIG. 6 should be understood as being illustrative and should not be construed as being limiting in any way. Block 602 may be followed by block 604.

At block 604 [measure reflected light], the lighting device 110 can be configured to measure light at the lighting device 110. It can be appreciated from the above descriptions of FIGS. 1-5 that the lighting device 110 can measure the reflected light using the light sensor 116. Furthermore, it can be appreciated from the above description, that the light measured at block 604 can correspond to a light level measured during operation of the illumination source 114 in an on operation mode, in an off operation mode, and/or in other operation modes as disclosed herein. Furthermore, it can be appreciated that the light measured in block 604 can be outputted by the light sensor 116 as the sensed data 122. It should be understood that this embodiment is illustrative, and should not be construed as being limiting in any way. Block 604 may be followed by block 606.

At block 606 [generate light level data], the lighting device 110 can be configured to generate the light level data 108. As explained above with reference to FIGS. 1-5, the light level data 108 can be generated by the control module 118. In some embodiments, the control module 118 is configured to apply one or more compressive sensing algorithms to the sensed data 122 and to output the light level data 108. As explained above, the light level data 108 can be output, in some embodiments, as light level maps or other data corresponding to representations of occupancy or ambient light level information near the lighting device 110 such as the light level maps 400A, 400B illustrated and described above with reference to FIGS. 4 and 5. It should be understood that these embodiments are illustrative, and should not be construed as being limiting in anyway. Block 606 may be followed by block 608.

At block 608 [transmit light level data], the lighting device 110 can be configured to transmit the light level data 108 to the controller 102. As explained herein, the controller 102 can use the light level data 108 to determine if the operation of the lighting device 110 is to be modified in any way. As noted above, the controller 102 can generate the control data 112 to control the lighting device 110, if desired. It can also be appreciated that in embodiments wherein the functionality described herein with regard to the controller 102 is integrated into the lighting devices 110 as the control module 118, and/or in embodiments wherein the lighting devices 110 are configured to communicate with one another, the functionality described herein with respect to block 608 can be omitted. Block 608 may be followed by block 610.

At block 610 [receive control data], the lighting device 110 can be configured to receive the control data 112 from the controller 102. As mentioned above, the control module 118 of the lighting device 110 can be configured to generate the control data 112 and/or otherwise control operation of the lighting device 110, the illumination, source 114, the light sensor 116, and/or other components of the lighting device 110. As such, functionality of block 610 can be omitted, if desired. An illustrative process for generating the control data 112 is illustrated and described below with reference to FIG. 6.

The control data 112 can include instructions, parameters, data, and/or signals for control operation of the lighting device 110. The control data 112 can indicate, for example, that the illumination source 114 is to be pulsed, operated in an on mode of operation, operated in an off mode of operation, dimmed, undimmed, operated in various colors, or the like. The control data 112 can also indicate that the light sensor 116 is to be activated, deactivated, and/or pulsed as explained herein. As such, the control data 112 can be used to control the lighting device based upon occupancy and/or ambient light levels, as will be explained in more detail below with reference to FIG. 6. The control data 112 can also indicate that the operation of the lighting device 110 is not to be changed. Because other aspects of the lighting device 110 can be controlled by the control data 112, it should be understood that these embodiments are illustrative, and should not be construed as being limiting in any way. Block 610 may be followed by block 612.

At block 612 [change in, operation mode?], the lighting device 110 can be configured to determine if an operation mode of the illumination source 114 is to be changed. As explained above, the control data 112 can indicate that the operation mode of the illumination source 114 and/or the light sensor 116 is to be changed and/or the lighting device 110 can determine that such a change is to be made. According to some embodiments, the lighting device 110 and/or the controller 102 can make this determination based upon occupancy and/or ambient light detected by the lighting device 110, as explained in more detail below with, reference to FIG. 6.

If the lighting device 110 determines, in block 612, that a change is to be made in the operation mode, then block 612 may be followed by block 614 [change operation mode], wherein the lighting device 110 can be configured to change the operation mode associated with the lighting device 110 the illumination source 114, and/or the light sensor 116 in accordance with the control data 112 received in block 610. As such, the lighting device 110 can, in response to the determination described above with respect to block 610, activate or deactivate the illumination source 114, activate or deactivate the light sensor 116, increase or decrease intensity of the illumination source 114, change, a color of the illumination source 114, and/or otherwise modify operation of the lighting device 110 and/or components thereof. Block 614 may be followed by block 616. Alternatively, block 612 may be followed by block 616 if the lighting device 110 determines, in block 612 that the operation mode associated with the light device is not to be changed.

At block 616 [end], the process 600 can end. Alternatively, as shown in FIG. 6, the process 600 may repeat (e.g., periodically, continuously, or on-demand) or terminate at any time, as noted above. As such, the process 600 can return to block 602 from blocks 612 and/or 614 instead of ending at block 616.

Figure 7:
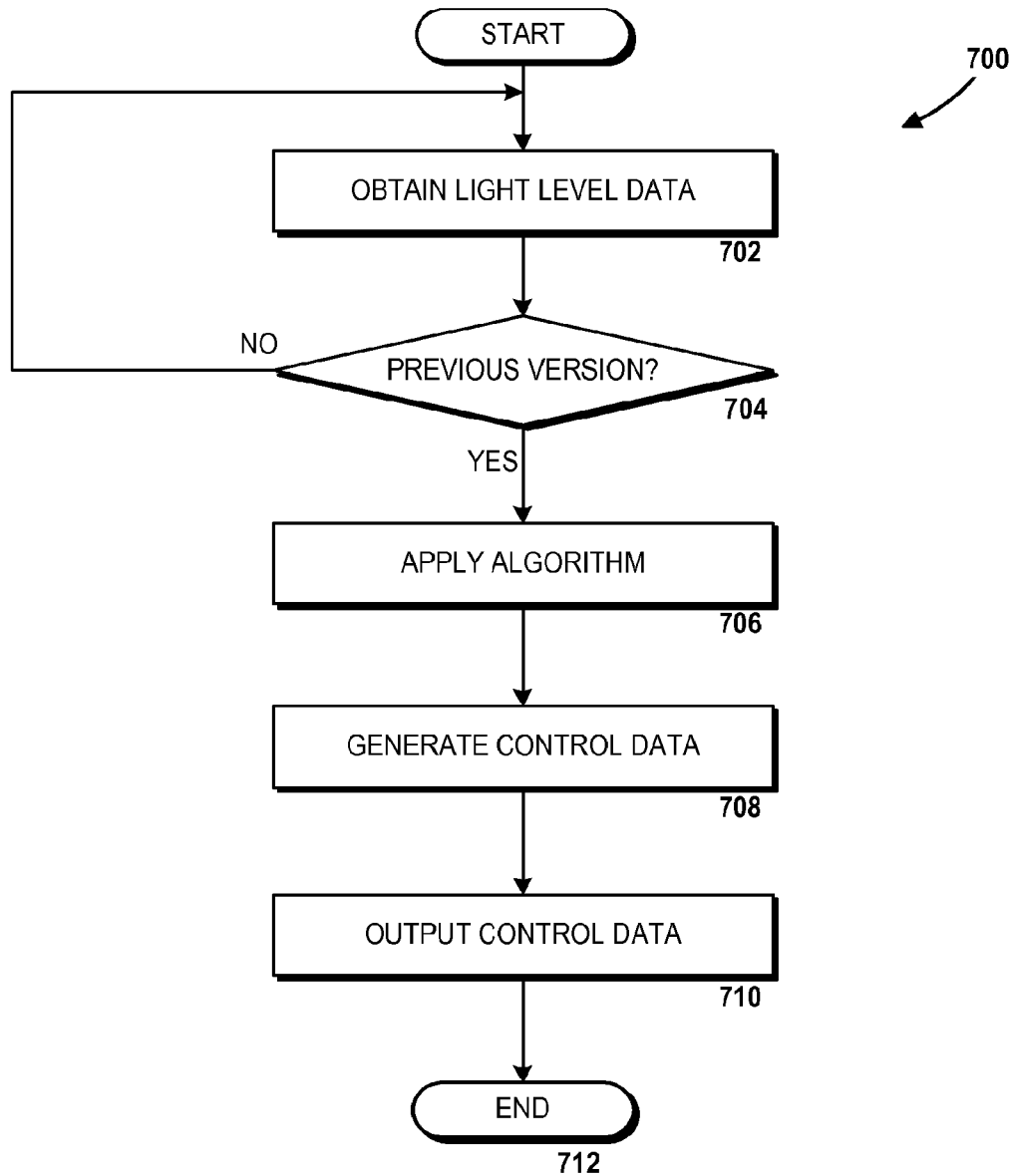
FIG. 7 is a flow diagram illustrating an example process for generating control data for controlling the lighting device.

Turning now to FIG. 7, a flow diagram illustrating an example process 700 for generating the control data 112 for controlling the lighting device 110, arranged according to at least some embodiments presented herein, will be described. The process 700 can include various operations, functions, or actions as illustrated by one or more blocks 702-712. The process 700 begins at block 702 [obtain light level data], wherein the controller 102 can be configured to obtain the light level data 108 from one or more of the lighting devices 110. It should be understood that in some embodiments, the light level data 108 can be received or otherwise obtained by the controller 102 in conjunction with the lighting device 110 generating and transmitting the light level data 108 as described above with reference to operations 506-508 of FIG. 5, though this is not necessarily the case. In some other embodiments, as described above, the functionality of the controller 102 can be integrated into the lighting device 110 and as such, the light level data 108 can be received at the controller 102 without being transmitted. As such, the illustrated embodiment should be understood as being illustrative and should not be construed as being limiting in any way. Block 702 may be followed by block 704.

At block 704 [previous version?], the controller 102 can be configured to determine if a previous version of the light level data 108 obtained in block 702 has been obtained, stored, or otherwise is accessible to the controller 102. As such, it should be understood that the controller 102 can be configured to store the light level data 108 obtained in block 702 and/or to control other devices, systems, nodes, or the like for storing the light level data 108. As such although not shown in FIG. 7 an operation or other action for storing the light level data 108 can be included, in the process 700.

If the controller 102 determines, in block 704, that a previous version of the light level data 108 has not been obtained, the process 700 can return to block 702, wherein the controller 102 can be configured to again obtain the light level data 108. As such, the controller 102 can be configured to repeat blocks 702-704 of the process 700 until two or more versions of the light level data 108 have been obtained. If the controller 102 determines, in any iteration of block 704, that a previous version of the light level data 108 has been obtained, the process 700 can proceed to block 706 [apply algorithm].

At block 706, the controller 102 can be configured to apply one or more algorithms to the light level data 108 obtained in block 702. In some embodiments, the controller 102 can be configured to apply an ambient light algorithm to the light level data 108 to determine if an operation mode of the illumination source 114 is to be changed. For example, the controller 102 can be configured to determine that the illumination source 114 is to be activated in response to determining that an ambient light level at or near the lighting device 110 is above, meets, or is below a threshold or other defined level. Similarly, the controller 102 can be configured to determine that an activated illumination source such as the illumination source 114 is to be deactivated in response to determining that an ambient light, level measured during an of pulse of the illumination source 114 is above or meets a defined threshold or other level.

In some embodiments, the functionality described herein with respect to block 706 can be completed for each of multiple versions of the light level data 108. As such, two or more versions of the light level data 108 can be compared to identify movements of entities, as illustrated and described above with reference to FIGS. 4 and 5. In some other embodiments, a single version of the light level data 108 can be used and/or the algorithm can be applied against, the single version in block 706. In particular, in some embodiments, ambient light levels can be determined and/or used to generate the control data 112 and as such, a single version of the light level data 108 can be used instead of multiple versions as illustrated in FIG. 7. In some such embodiments, the functionality described herein with respect to block 704 can be omitted. It should be understood that this embodiment is illustrative, and, should, not be construed as being limiting in any way.

In yet other embodiments, two or more versions of the light level, data 108 can be used to generate control data 112 based upon ambient light levels. In particular, a first version of the light level data 108 can correspond to the ambient light level when the illumination source 114 is activated and a second version of the light level data 108 can correspond to the ambient light level when the illumination source 114 is deactivated, or vice versa. As such, two versions of the light level data 108 can be compared and/or algorithms can be applied to these two versions of the light level data 108 to generate the control data 112. As such, multiple versions of the light level data 108 can be used for determining the control data 112 based upon ambient light levels and/or occupancy.

In the illustrated embodiment of FIG. 7, the controller 102 can be configured to apply an occupancy algorithm and/or a movement algorithm to the light level data 108 obtained in block 702 to determine if the operation mode of the illumination source 114 is to be changed. As noted above, the light sensor 116 can also be controlled based upon the functionality for applying algorithms described herein with respect to block 706, though this is not explicitly illustrated in FIG. 7. In the illustrated embodiment, the controller 102 can be configured to determine that the illumination source 114 is to be activated or deactivated in response to determining occupancy or lack of occupancy in an area associated with the lighting device 110. It should be understood that this embodiment is illustrative, and should not be construed as being limiting in any way. Block 706 may be followed by block 708.

At block 708 [generate control data], the controller 102 can be configured to generate the control data 112. It can be appreciated from the above description that the controller 102 can determine, based upon applying the algorithms in block 706 and/or based upon other considerations, if an operation, mode of the lighting device 110 is to be changed. As such, the controller 102 can be configured, to generate instructions and/or control signals for controlling the operation mode of the lighting device 110. The operation modes, as explained herein, can include on off operation modes, dimmed/undimmed operation modes, colored/non-colored operation modes, solid operation modes, pulsed operation modes, or other operation modes.

The control data 112 can be generated based upon various algorithms, settings, and/or options, which can be set by software, users, and/or device settings. For example, the control data 112 can be generated based upon a rule that can specify that operation of the lighting device is to be changed or set to a particular mode if movement is detected in the field of vision of the light sensor 116. As such, movement of an entity near the lighting device 110 can be used to generate control data 112 that instructs the lighting device to activate or deactivate the illumination source 114, for example. Thus, embodiments of the lighting device 110 can provide motion sensing lights.

The control data 112 can also be generated based upon a rule that ambient light levels are to be maintained at a substantially continuous level at or near the lighting device 110. Thus, for example, embodiments of the concepts and technologies disclosed herein can be used to maintain a light level at or near the lighting device 110. The control data 112 can be configured to instruct the lighting device 110 to alter or maintain operation modes in response to the light level data 108 analyzed by way of applying the algorithm as explained in block 706. Because the control data 112 can be used to control various aspects of the lighting device 110, as explained herein, it should be understood that these embodiments are illustrative, and should not be construed as being limiting in any way. Block 708 may be followed by block 710.

At block 710 [output control data], the controller 102 may be configured to output the control data 112 generated in block 708. In some embodiments, the controller 102 can be configured to transmit the control data 112 to the lighting device 110. In some other embodiments, the control application 106 can be configured to output the control data 112 and other components of the controller 102 can be configured to transmit, relay, host, and/or otherwise make the control data 112 available for the lighting device 110. In yet other embodiments, the control module 118 can be configured to provide the functionality described herein with respect to the controller 102 and as such, can be configured to output control signals in response to generating and implementing the control data 112. As such, the illustrated embodiment should be understood as being illustrative and should not be construed as being limiting in any way. Block 710 may be followed by block 712.

At block 712 [end], the process 700 can end. Although not shown in FIG. 7, the process 700 can also repeat from block 712. In particular, the process 700 can return to block 702 after block 710. The process 700 may repeat (e.g., periodically, continuously, or on-demand) or terminate at any time, as noted above.

While the above description of the FIGS. 1-7 has described embodiments for controlling operation of a single lighting device 110, it should be understood that multiple lighting devices 110 can be used to supplement and/or substitute the described embodiments with additional functionality. For example, in some embodiments, a number of the lighting devices 110 can be networked together and/or can be configured to communicate with the controller 102. The multiple lighting devices 110 can be associated with a particular location within a room, building, other structure, area, or the like, by the controller 102 and/or by the lighting devices 110 themselves. Thus, movement, presence, and/or ambient light levels detected at multiple lighting devices 110 can be used to control multiple or single lighting devices 110. As such, some embodiments of the lighting devices 110 can be configured to intelligently track movements of people or other entities and/or to predict movements of the people or other entities by detecting light levels at or near the lighting devices 110. Lighting devices 110 in other areas of a building or other structure can be controlled based upon predicted movements and/or tracked movements detected or determined at other lighting devices 110. Some predictive movement algorithms included self-learning techniques to track and improve predictive techniques and/or to learn behavior of occupants at or near the lighting devices 110.

In some embodiments, the lighting devices 110 and/or the controller 102 can be configured to be controlled via an Internet connection or other interface. Thus, for example, a user may connect to the lighting devices 110 and/or the controller 102 using a smart phone, a laptop, a desktop, or other computing device to control the operations of the lighting devices 110 and/or the controller 102. As such, users can be able to control light levels, movement algorithms, predictive movement features, and/or other aspects of the concepts and technologies disclosed herein via various embodiments of the lighting devices 110 and/or the controller 102. It should be understood that these embodiments are illustrative, and should not be construed as being limiting in any way.

In one contemplated embodiment, the concepts and technologies disclosed herein can be used to replace a burglar alarm or other premises-monitoring equipment. In particular, the lighting device 110 can be used to provide functionality typically associated with a motion detector by pulsing operation of the illumination source 114 and/or the light sensor 116 as described above. The lighting device 110 also can be configured to report occupancy to the controller 102 and/or the control module 118. The controller 102 and/or the control module 118 can be configured to activate sirens, activate lights, or take other actions such as initiating phone calls or sending emails in response to detected movements. It should be understood that these embodiments are illustrative, and should not be construed as being limiting in any way.

While the above embodiments of the lighting device 110 and the controller 102 have been described as being capable of executing compressive sensing algorithms, it should be understood that these embodiments are illustrative. In particular, some embodiments of the lighting device 110 and/or the controller 102 can be configured to provide the functionality described herein without use of a compressive sensing algorithm. As such, while some embodiments of the concepts and technologies disclosed herein make use of compressive sensing technologies, these embodiments are illustrative and should not be construed as being limiting in any way.

Figure 8:
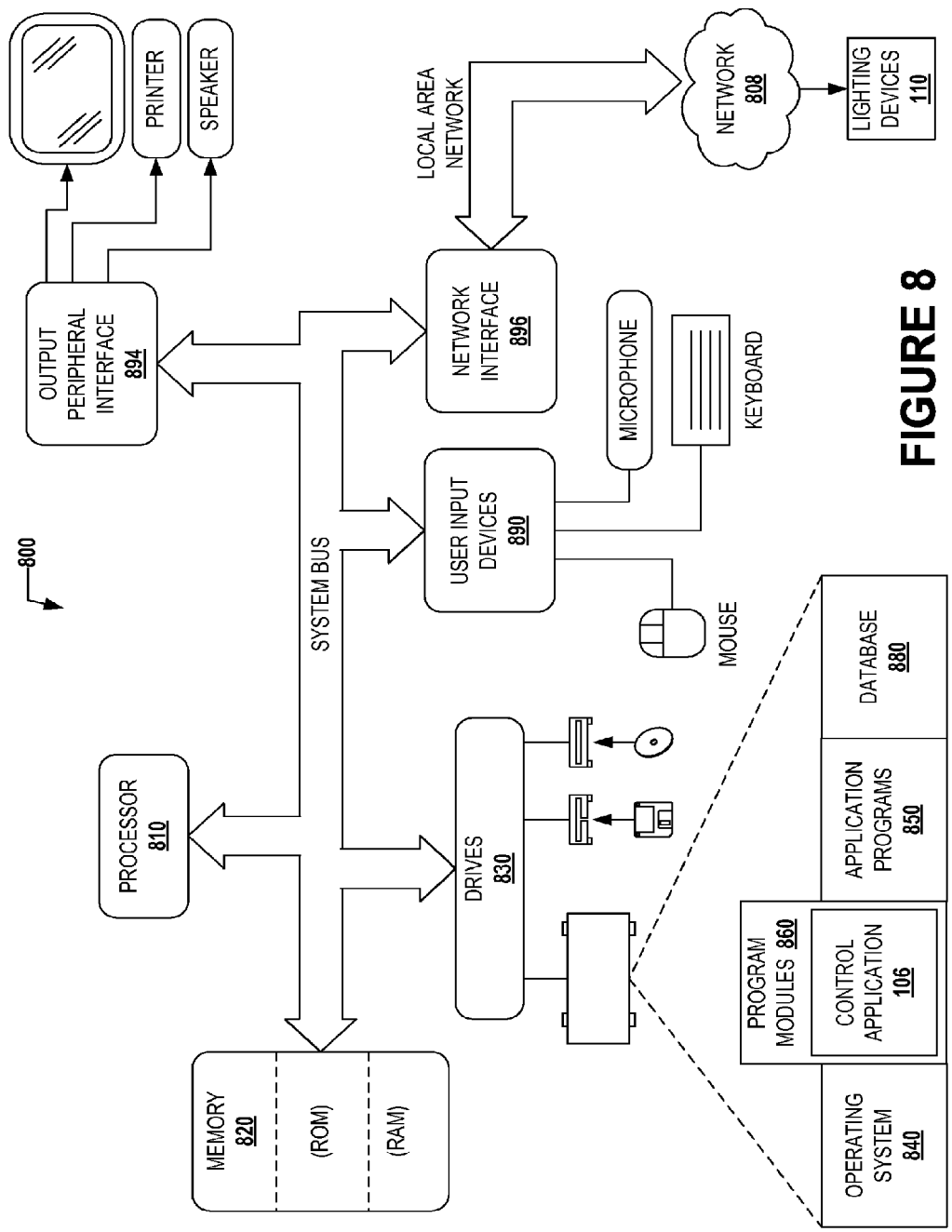
FIG. 8 is a block diagram illustrating an example computer capable of controlling lighting devices having integrated occupancy and ambient light sensors.

FIG. 8 is a block diagram illustrating an example computer 800 capable of controlling lighting devices having integrated occupancy and ambient light sensors arranged according to at least some embodiments presented herein. As depicted, the computer 800 includes a processor 810, a memory 820 and one or more drives 830. The computer 800 may be implemented as a conventional computer system, an embedded control computer, a laptop, or a server computer, a mobile device, a mobile telephone, a customized machine, or other hardware platform.

The drives 830 and their associated computer storage media, provide storage of computer-readable instructions, data structures, program modules and other data for the computer 800. The drives 830 can include an operating system 840, application programs 850, program modules 860, and a database 880. The program modules 860 may include the control application 106. The control, application 106 may be adapted to execute either or both of the processes 600 and/or 700 for controlling integrated occupancy and ambient light sensors and/or generating the control data 112 as described in, greater detail above (e.g., see previous description with respect to one or more of FIGS. 6 and 7, respectively). The computer 800 further includes user input devices 890 through which a user may enter commands and data. The input devices 890 can include one or more of an electronic digitizer, a microphone, a keyboard and pointing device, commonly referred to as a mouse, trackball or touch pad. Other input devices may include a joystick, game pad, satellite dish, scanner, other devices, or the like.

These and other input devices can be coupled to the processor 810 through a user input interface that is coupled to a system bus, but may be coupled by other interface and bus structures, such as a parallel, port, game port or a universal serial bus ("USB"). Computers such as the computer 800 may also include other peripheral, output devices such as speakers, printers, displays, and/or other devices, which may be coupled through an output peripheral interface 894 or the like.

The computer 800 may operate in a networked environment using logical connections to one or more computers, such as a remote computer (not illustrated), the lighting devices 110, and/or other devices operating as part of or in communication with a network 808 coupled to a network interface 896. The remote computer may be a personal computer, a server, a router, a network PC, a peer device or other common network node, a control module 118 of one of the lighting devices 110, and can include many or all of the elements described above relative to the computer 800. Networking environments are commonplace in offices, enterprise-wide area networks ("WAN"), local area networks ("LAN"), intranets, and the Internet.

When used in a LAN or WLAN networking environment, the computer 800 may be coupled to the LAN through the network interface 896 or an adapter. When used in a WAN networking environment, the computer 800 typically includes a modem or other means for establishing communications over the WAN, such as the Internet or the network 808. The WAN may include the Internet, the illustrated network 808, various other networks, or any combination thereof. It will be appreciated that other mechanisms of establishing a communications link, ring, mesh, bus, cloud, or network between the computers may be used.

According to some embodiments, the computer 800 may be coupled to a networking environment. The computer 800 may include one or more instances of a physical computer-readable storage medium or media associated with the drives 830 or other storage devices. The system bus may enable the processor 810 to read code and/or data to/from the computer storage media. The media may represent an, apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as the storage drives 830 or otherwise. Hard drive implementations may be characterized as solid state, or may include rotating media storing magnetically-encoded information.

The storage media may include one or more program modules 860. The program modules 860 may include software instructions that, when loaded into the processor 810 and executed, transform a general-purpose computing system into a special-purpose computing system. As detailed throughout this description, the program modules 860 may provide various tools or techniques by which the computer 800 may participate within the overall systems or operating environments using the components, logic flows, and/or data structures discussed herein.

The processor 810 may be constructed from any number of transistors or other circuit elements, which may individually or collectively assume any number of states. More specifically, the processor 810 may operate as a state machine or finite-state machine. Such a machine may be transformed to a second machine, or specific machine by loading executable instructions contained within the program modules 860. These computer-executable instructions may transform the processor 810 by specifying how the processor 810 transitions between states, thereby transforming the transistors or other circuit elements constituting the processor 810 from a first machine to a second machine. The states of either machine may also be transformed by receiving input from the one or more user input devices 890, the network interface 896, other peripherals, other interfaces, or one or more users or other actors. Either machine may also transform states, or various physical characteristics of various output devices such as printers, speakers, video displays, or otherwise.

Encoding the program modules 860 may also transform the physical structure of the storage media. The specific transformation of physical structure may depend on various factors, in different implementations of this description. Examples of such factors may include, but are not limited to the technology used to implement the storage media, whether the storage media are characterized as primary or secondary storage, or the like. For example, if the storage media are implemented as semiconductor-based memory, the program modules 860 may transform the physical state of the semiconductor memory 820 when the software is encoded therein. For example, the software may transform the state of transistors, capacitors, or other discrete circuit, elements constituting the semiconductor memory 820.

As another example, the storage media may be implemented using magnetic or optical technology such as drives 830. In such implementations, the program modules 860 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

Figure 9:
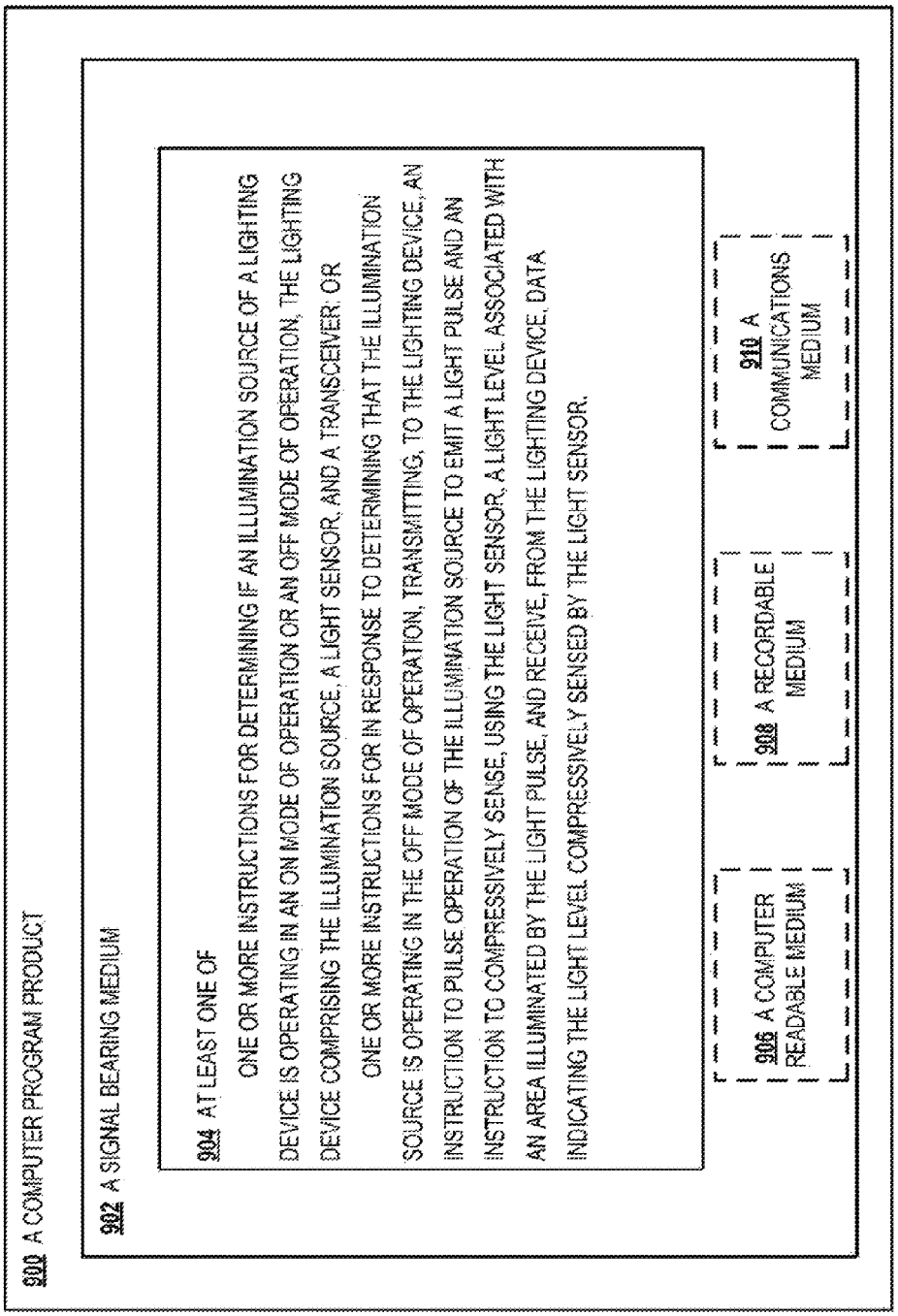
FIG. 9 is a schematic diagram illustrating computer program product for controlling lighting devices having integrated occupancy and ambient light sensors, all arranged according to at least some embodiments presented herein.

FIG. 9 is a schematic diagram illustrating computer program product 900 for controlling lighting devices having integrated occupancy and ambient light sensors arranged according to at least some embodiments presented herein. An illustrative embodiment, of the example computer program product 900 is provided using a signal bearing medium 902, and may include at least one instruction 904. The at least one instruction 904 may include: one or more instructions for determining if an illumination source of a lighting device is operating in an on mode of operation or an off mode of operation, the lighting device comprising the illumination source, a light sensor, and a transceiver; or one or more instructions for in response to determining that the illumination source is operating in the off mode of operation, transmitting, to the lighting device, an instruction to pulse operation of the illumination source to emit a light pulse and an instruction to compressively sense, using the light sensor, a light level associated with an area illuminated by the light pulse, and receive, from the lighting device, data indicating the light level compressively sensed by the light sensor. In, some embodiments, the signal bearing medium 902 of the one or more computer program product 900 include a computer readable medium 906, a recordable medium 908, and/or a communications medium 910.

While the subject matter described herein is presented in the general context of program modules that execute in conjunction with the execution of an operating system and application programs on a computer system, those skilled in the art will recognize that, other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is, not intended to be limiting.

With respect, to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in, the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction, is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein, can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a computing device to control an operation of a lighting device, wherein the lighting device includes an illumination source and a light sensor, the method comprising:
   determining a mode of operation of the illumination source, wherein the mode of operation includes one of an on mode of operation and an off mode of operation;
   detecting the illumination source as operating in the off mode of operation;
   pulsing the illumination source to the on mode of operation to generate a light pulse;
   compressively sensing, using the light sensor, a light level associated with an area illuminated by the light pulse;
   sensing a color temperature associated with the area illuminated by the light pulse;
   measuring, using the light sensor, an illumination intensity of the illumination source and a color of light to emit from the illumination source; and
   activating the illumination source to the on mode of operation.

2. The method of claim 1, further comprising:
   transmitting a communication to another illumination source of another lighting device to prompt an adjustment of one or more of the illumination intensity and the color of light, wherein the illumination source of the lighting device and the another illumination source of the another lighting device are coupled via wires; and
   adjusting one or more of the illumination intensity and the color of light.

3. The method of claim 1, further comprising:
   transmitting a communication to another illumination source of another lighting, device to prompt an adjustment of one or more of the illumination intensity and the color of light, wherein the illumination source of the lighting device is coupled wirelessly to the another illumination source of the another lighting device; and
   adjusting one or more of the illumination intensity and the color of light.

4. The method of claim 1, further comprising:
   applying an ambient light algorithm to data associated with the light level to determine if the data is one of at a threshold, below the threshold, or above the threshold;
   detecting that the data is below the threshold; and
   activating the illumination source to modify the triode of operation of the illumination source.

5. The method of claim 1, further comprising:
   applying an ambient light algorithm to data associated with the light level to determine the data is one of at a threshold, below the threshold, or above the threshold;
   detecting that the data one of: meets the threshold or is above the threshold; and
   maintaining the mode of operation of the illumination source.

6. The method of claim 1 further comprising:
   applying one or more of an occupancy algorithm and a movement algorithm to data associated with the light level to determine if the data is one of at a threshold, below the threshold, or above the threshold;
   detecting that the data is below the threshold; and
   activating the illumination source to modify the mode of operation of the illumination source.

7. The method of claim 1, further comprising:
   applying one or more of an occupancy algorithm and a movement algorithm to data associated with the light level to determine if the data is one of at a threshold, below the threshold, or above the threshold;
   detecting that the data one of: meets the threshold or is above the threshold; and
   activating the illumination source to modify the mode of operation of the illumination source.

8. The method of claim 1, further comprising:
   detecting, based on the light level, a presence of an entity in the area illuminated by the light pulse, wherein the light level corresponds to an ambient light level in the area illuminated by the light pulse.

9. The method of claim 8, further comprising:
   applying a compressive sensing algorithm to the light level to generate a light level map;
   analyzing the light, level map to identify movement vectors of the entity within the area illuminated by the light pulse; and
   determining, based on an analysis of the movement vectors, a movement of the entity and a direction associated with the movement of the entity within the area illuminated by the light pulse.

10. The method of claim 8, further comprising:
applying a compressive sensing algorithm to the light level to generate a histogram;
analyzing the histogram to identify movement vectors of the entity within the area illuminated by the light pulse; and
determining, based on an analysis of the movement vectors, a movement of the entity and a direction associated with the movement of the entity within the area illuminated by the light pulse.

11. A lighting system, comprising:
a lighting device that includes an illumination source and a light sensor;
a controller configured to be in communication with the lighting device, wherein the controller is further configured to:
  determine a mode of operation of the illumination source, wherein the mode of operation includes one of an on mode of operation and an off mode of operation;
  detect the illumination source as operating in the off mode of operation;
  generate a pulse operation of the illumination source, wherein the pulse operation is configured to emit a light pulse;
  generate a measure operation of the illumination source, wherein the measure operation is configured to measure, by use of the light sensor, a first light level and a second light level associated with an area illuminated by the light pulse;
  transmit, to the lighting device, the pulse operation of the illumination source and the measure operation of the light sensor;
  receive, at the controller, data that indicates one or more of the first light level and the second light level measured by the light sensor;
  apply a compressive sensing algorithm to the first light level to generate a first light level map;
  apply the compressive sensing algorithm to the second light level to generate a second light level map;
  analyze the first light level map and the second light level map to identify movement vectors within the area illuminated by the light pulse;
  determine, based on the analysis of the first light level map and the second light level map, a movement of a first emit and a direction associated with the movement of the first emit within the area illuminated by the light pulse;
  apply one or more of an occupancy algorithm and a movement algorithm to data associated with the first light level and the second light level to determine if the data is one of at a threshold, below the threshold, or above the threshold;
  detect that the data is below the threshold; and
  activate the illumination source to modify the mode of operation of the illumination source.

12. The lighting system of claim 11, wherein the first light level indicates a presence of a second entity in the area illuminated by the light pulse, and wherein the second light level indicates a presence of the first entity in the area illuminated by the light pulse.

13. A lighting system comprising:
a lighting device that includes an illumination source and a light sensor;
a controller configured to be in communication with the lighting device, wherein the controller is further configured to:
  determine a mode of operation of the illumination source, wherein the mode of operation includes one of an on mode of operation and an off mode of operation;
  detect the illumination source as operating in the off mode of operation;
  generate a pulse operation of the illumination source, wherein the pulse operation is configured to emit a light pulse;
  generate a measure operation of the illumination source, wherein the measure operation is configured to measure, by use of the light sensor, a first light level and a second light level associated with an area illuminated by the light pulse;
  transmit, to the lighting device, the pulse operation of the illumination source and the measure operation of the light sensor;
  receive, at the controller, data that indicates one or more of the first light level and the second light level measured by the light sensor;
  apply a compressive sensing algorithm to the first light level to generate a first histogram, wherein the first histogram identifies ambient light levels in areas illuminated by the illumination source;
  apply the compressive sensing algorithm to the second light level to generate a second histogram, wherein the second histogram identifies additional ambient light levels in the areas illuminated by the illumination source;
  perform a pixel-to-pixel comparison of the first histogram and the second histogram to identify movement vectors within the area illuminated by the light pulse;
  determine, based on an analysis of the movement vectors, a movement of a first entity and a direction associated with the movement of the first entity within the area illuminated by the light pulse;
  apply one or more of an occupancy algorithm and a movement algorithm to data associated with the first light level and the second light level to determine if the data is one of at a threshold, below the threshold, or above the threshold;
  detect that the data is below the threshold; and
  activate the illumination source to modify the mode of operation of the illumination source.

14. The lighting system of claim 11, wherein the illumination source is configured to illuminate one or more of an outdoor area, an area of a room, an area of a building, and an area of a landscape.

15. A computer-readable storage medium with instructions stored thereon to control an operation of a lighting device, wherein the lighting device includes an illumination source and a light sensor, the instructions being executable by a processor to perform or cause to be performed operations comprising:
determining a mode of operation of the illumination source, wherein the mode of operation includes one of an on mode of operation and an off mode of operation;
detecting the illumination source as operating in the of mode of operation;
pulsing the illumination source to the on mode of operation to generate a light pulse;
compressively sensing, by use of the light sensor, a light level associated with an area illuminated by the light pulse;
sensing a color temperature associated with the area illuminated by the light pulse;

determining an illumination intensity of the illumination source;

determining a color of light to emit from the illumination source; and activating the illumination source to the on mode of operation.

16. The computer-readable storage medium of claim 15, wherein the instructions are executable by the processor to perform or cause to be performed operations that further comprise:

detecting, based on the light level, a presence of an entity in the area illuminated by the light pulse, wherein the light level corresponds to an ambient light level in the area illuminated by the light pulse;

applying a compressive sensing algorithm to the light level to generate a light level map;

analyzing the light level map to identify movement vectors of the entity within the area illuminated by the light pulse; and determining, based on an analysis of the movement vectors, a movement of the entity and a direction associated with the movement of the entity within the area illuminated by the light pulse.

17. The computer-readable storage medium of claim 15, wherein the instructions are executable by the processor to perform or cause to be performed operations that further comprise:

detecting, based on the light level, a presence of an entity in the area illuminated by the light pulse, wherein the light level corresponds to an ambient light level in the area illuminated by the light pulse;

applying a compressive sensing algorithm to the light level to generate a histogram;

analyzing the histogram to identify movement vectors of the entity within the area illuminated by the light pulse; and determining, based on an analysis of the movement vectors, a movement of the entity and a direction associated with the movement of the entity within the area illuminated by the light pulse.

* * * * *

UNITED STATES PATENT AND TRADEMARK OFFICE
CERTIFICATE OF CORRECTION

PATENT NO. : 9,693,426 B2
APPLICATION NO. : 14/975690
DATED : June 27, 2017
INVENTOR(S) : Van Der Werff It is certified that error appears in the above-identified patent and that said Letters Patent is hereby corrected as shown below:

In Column 1, Line 51, delete "compressive," and insert -- compressive --, therefor.

In Column 1, Line 57, delete "interpret," and insert -- interpret --, therefor.

In Column 1, Line 61, delete "light" and insert -- light, --, therefor.

In Column 1, Line 67, delete "detect," and insert -- detect --, therefor

In Column 2, Line 16, delete "controller," and insert -- controller --, therefor.

In Column 2, Line 43, delete "in, an" and insert -- in an --, therefor.

In Column 2, Line 67, delete "device," and insert -- device --, therefor.

In Column 3, Line 20, delete "light-emitting," and insert -- light-emitting --, therefor.

In Column 3, Line 25, delete "with," and insert -- with --, therefor

In Column 3, Line 28, delete "module," and insert -- module --, therefor.

In Column 3, Line 55, delete "line," and insert -- line --, therefor

In Column 4, Line 40, delete "module," and insert -- module --, therefor.

In Column 4, Line 40, delete "integrated," and insert -- integrated --, therefor.

In Column 4, Line 50, delete "module," and insert -- module --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

In Column 4, Line 60, delete "to," and insert -- to --, therefor.

In Column 5, Line 30, delete "In, some" and insert -- In some --, therefor.

In Column 6, Line 35, delete "power," and insert -- power --, therefor.

In Column 6, Line 64, delete "instead of" and insert -- instead of, --, therefor.

In Column 7, Line 47, delete "amplification" and insert -- amplification, --, therefor.

In Column 7, Line 58, delete "histogram" and insert -- histogram, --, therefor.

In Column 8, Line 11, delete "to, sense" and insert -- to sense --, therefor.

In Column 8, Line 17, delete "control," and insert -- control --, therefor.

In Column 8, Line 49, delete "control," and insert -- control --, therefor.

In Column 8, Line 53, delete "instead of" and insert -- instead of, --, therefor.

In Column 9, Line 5, delete "120 can," and insert -- 120 can --, therefor.

In Column 9, Line 7, delete "of, the" and insert -- of the --, therefor.

In Column 9, Line 49, delete "level," and insert -- level --, therefor.

In Column 10, Line 4, delete "using an," and insert -- using an --, therefor.

In Column 10, Line 17, delete "limiting in," and insert -- limiting in --, therefor.

In Column 10, Line 26, delete "limited to," and insert -- limited to --, therefor.

In Column 10, Line 28, delete "thereof" and insert -- thereof; --, therefor.

In Column 12, Line 42, delete "such, it" and insert -- such it --, therefor.

In Column 12, Line 48, delete "fixture," and insert -- fixture --, therefor

In Column 13, Line 3, delete "It, should" and insert -- It should --, therefor.

In Column 13, Line 4, delete "light," and insert -- light --, therefor.

In Column 13, Line 8, delete "As, such," and insert -- As such, --, therefor.

In Column 13, Line 31, delete "include," and insert -- include --, therefor.

CERTIFICATE OF CORRECTION (continued)
U.S. Pat. No. 9,693,426 B2

In Column 14, Line 6, delete "In, some" and insert -- In some --, therefor.

In Column 15, Line 21, delete "such" and insert -- such, --, therefor.

In Column 15, Line 54, delete "or, portions" and insert -- or portions --, therefor.

In Column 15, Line 65, delete "on, mode" and insert -- on mode --, therefor

In Column 16, Line 11, delete "to the" and insert -- to, the --, therefor.

In Column 17, Line 2, delete "illumination," and insert -- illumination --, therefor.

In Column 17, Line 26, delete "in, operation" and insert -- in operation --, therefor.

In Column 17, Line 36, delete "with," and insert -- with --, therefor.

In Column 17, Line 41, delete "device 110" and insert -- device 110, --, therefor.

In Column 17, Line 49, delete "change," and insert -- change --, therefor.

In Column 17, Line 54, delete "block 612" and insert -- block 612, --, therefor.

In Column 18, Line 16, delete "Block '702" and insert -- Block 702 --, therefor.

In Column 18, Line 24, delete "As such" and insert -- As such, --, therefor.

In Column 18, Line 25, delete "FIG. 7" and insert -- FIG. 7, --, therefor.

In Column 18, Line 26, delete "included," and insert -- included --, therefor.

In Column 18, Line 51, delete "light," and insert -- light --, therefor.

In Column 18, Line 52, delete "an of" and insert -- an off --, therefor.

In Column 18, Line 61, delete "against," and insert -- against --, therefor.

In Column 19, Line 2, delete "and, should," and insert -- and should --, therefor.

In Column 19, Line 5, delete "level," and insert -- level --, therefor.

In Column 19, Line 39, delete "operation," and insert -- operation --, therefor.
In Column 19, Line 40, delete "configured," and insert -- configured --, therefor.

CERTIFICATE OF CORRECTION (continued)
U.S. Pat. No. 9,693,426 B2

In Column 19, Line 43, delete "on off" and insert -- on/off --, therefor.

In Column 21, Line 48, delete "control," and insert -- control --, therefor.

In Column 21, Line 52, delete "described in," and insert -- described in --, therefor.

In Column 21, Line 65, delete "parallel," and insert -- parallel --, therefor.

In Column 21, Line 67, delete "peripheral," and insert -- peripheral --, therefor.

In Column 22, Line 34, delete "an, apparatus" and insert -- an apparatus --, therefor.

In Column 23, Line 13, delete "limited to" and insert -- limited to: --, therefor.

In Column 23, Line 21, delete "circuit," and insert -- circuit --, therefor.

In Column 23, Line 44, delete "embodiment," and insert -- embodiment --, therefor.

In Column 23, Line 59, delete "sensor. In," and insert -- sensor. In --, therefor.

In Column 24, Line 1, delete "that," and insert -- that --, therefor.

In Column 24, Line 29, delete "is, not" and insert -- is not --, therefor.

In Column 24, Line 30, delete "respect," and insert -- respect --, therefor.

In Column 24, Line 62, delete "skilled in," and insert -- skilled in --, therefor.

In Column 25, Line 2, delete "construction," and insert -- construction --, therefor.

In Column 24, Line 28, delete "herein," and insert -- herein --, therefor.

In Column 26, Line 13, in Claim 3, delete "lighting," and insert -- lighting --, therefor In Column 26, Line 26, in Claim 4, delete "triode" and insert -- mode --, therefor.

In Column 26, Line 61, in Claim 9, delete "light," and insert -- light --, therefor.

In Column 27, Line 46, in Claim 11, delete "emit" and insert -- entity --, therefor.

In Column 27, Line 47, in Claim 11, delete "emit" and insert -- entity --, therefor.
In Column 27, Line 62, in Claim 13, delete "system" and insert -- system, --, therefor.

In Column 28, Line 59, in Claim 15, delete "the of" and insert -- the off --, therefor.